(12) United States Patent
Domel et al.

(10) Patent No.: US 6,850,017 B1
(45) Date of Patent: Feb. 1, 2005

(54) HEAD RAIL-MOUNTED ACTUATOR FOR WINDOW COVERINGS

(75) Inventors: Douglas R. Domel, Chatsworth, CA (US); Winston G. Walker, Littleton, CO (US)

(73) Assignee: Harmonic Design, Inc., Cranbury, NJ (US)

( * ) Notice: Subject to any disclaimer, the term of this patent is extended or adjusted under 35 U.S.C. 154(b) by 0 days.

(21) Appl. No.: 09/454,723

(22) Filed: Dec. 4, 1999

Related U.S. Application Data

(63) Continuation of application No. 08/923,812, filed on Sep. 4, 1997, which is a continuation-in-part of application No. 08/559,467, filed on Nov. 15, 1995, now Pat. No. 5,698,958, which is a continuation-in-part of application No. 08/342,130, filed on Nov. 18, 1994, now Pat. No. 5,495,153, which is a continuation-in-part of application No. 08/094,570, filed on Jul. 20, 1993, now Pat. No. 5,391,967, which is a continuation-in-part of application No. 08/076,556, filed on Jun. 11, 1993, now Pat. No. 5,444,339.

(51) Int. Cl.[7] .............................................. H02K 29/00
(52) U.S. Cl. ...................... 318/138; 318/282; 318/17; 318/16; 318/469; 318/480; 160/168.1; 160/168.2; 160/176.1
(58) Field of Search ................................. 318/138, 282, 318/17, 16, 649, 480; 160/168.1, 168.2, 176.1

(56) References Cited

U.S. PATENT DOCUMENTS

| 5,274,499 | A | | 12/1993 | Shopp ........................ 359/461 |
|---|---|---|---|---|
| 5,495,153 | A | * | 2/1996 | Domel et al. .................. 318/17 |
| 5,552,769 | A | * | 9/1996 | Riordan ....................... 340/550 |
| 5,793,174 | A | * | 8/1998 | Kovach et al. .............. 318/468 |
| 5,883,480 | A | * | 3/1999 | Domel et al. ................ 318/282 |
| 5,909,093 | A | * | 6/1999 | Van Dinteren et al. ....... 318/16 |

FOREIGN PATENT DOCUMENTS

| JP | 29028 | 2/1983 |
|---|---|---|
| JP | 109484 | 6/1985 |
| JP | 192987 | 8/1989 |
| JP | 363495 | 12/1992 |

OTHER PUBLICATIONS

Luxaflex brochure Oct. 1, 1992.*
Bulletin: Draper, "Profile: The Electric Screen that Requires No Wiring," No. 792P. pp. HD 4493–4497, Jul. 15, 1992.

* cited by examiner

Primary Examiner—Karen Masih
(74) Attorney, Agent, or Firm—John L. Rogitz

(57) ABSTRACT

A mini-blind actuator has a motor and a housing that holds the motor and a dc battery. The rotor of the motor is coupled to the baton of the mini-blind for rotating the baton and thereby opening or closing the slats of the mini-blind. Alternatively, the rotor is coupled to the tilt rod of the blind to rotate the tilt rod and thereby open or close the slats of the mini-blind. A control signal generator generates a control signal for completing the electrical circuit between the battery and the motor. The control signal can be generated in response to a predetermined amount of daylight or in response to a user-generated remote command signal. The actuator can be used to rotate the slats of horizontal or vertical blinds, or the sections of a pleated shade. Or, the actuator can be used to rotate the hollow rotatable tube of a roll-up shade.

4 Claims, 12 Drawing Sheets

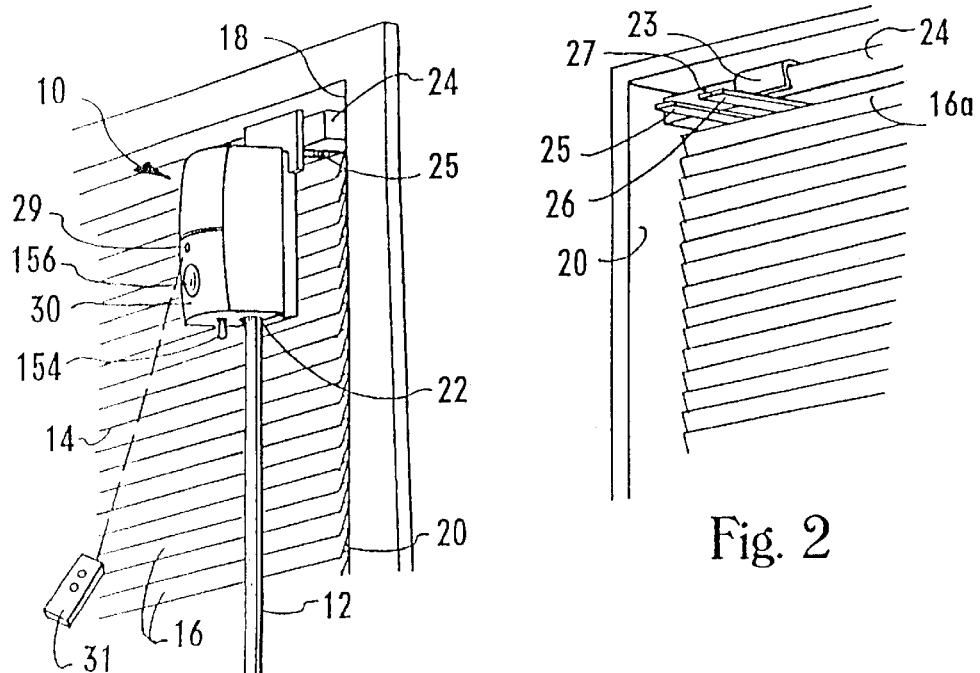
Fig. 1
Fig. 2
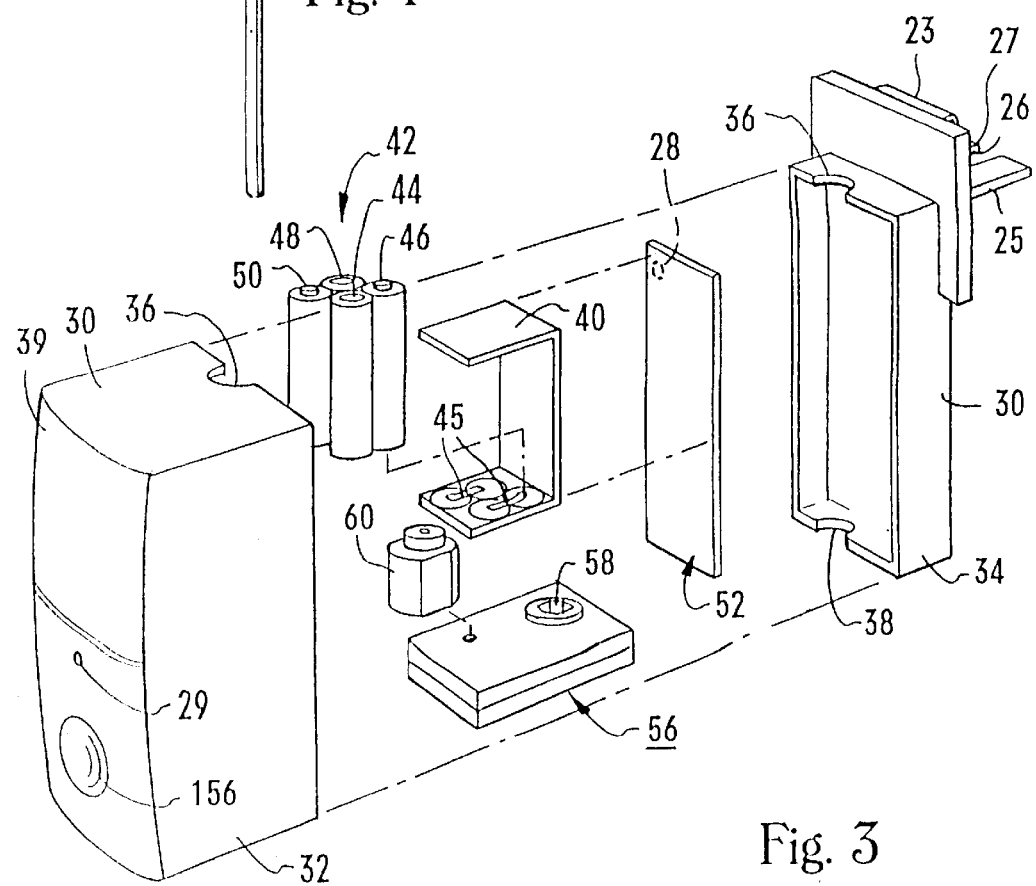
Fig. 3

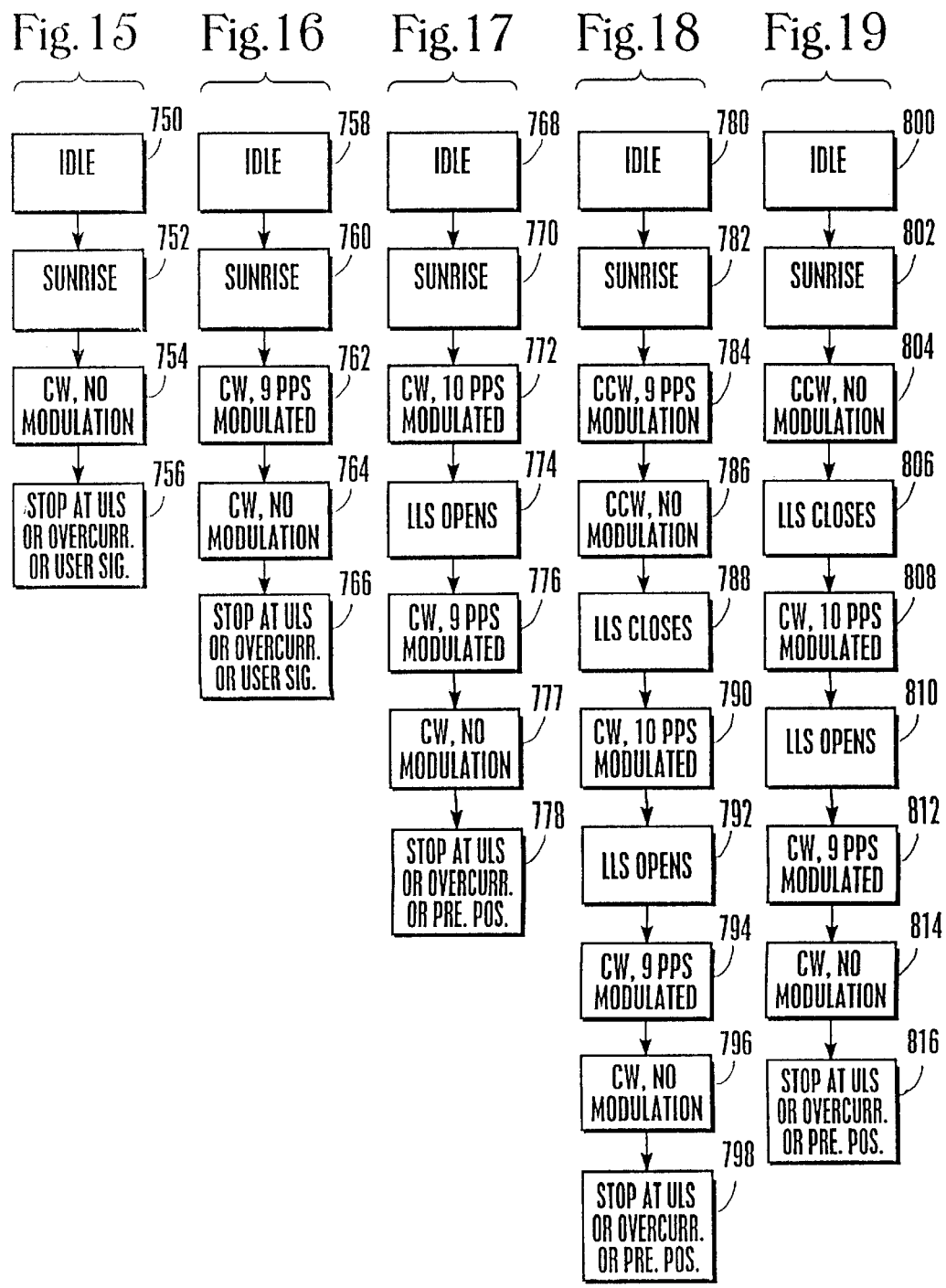

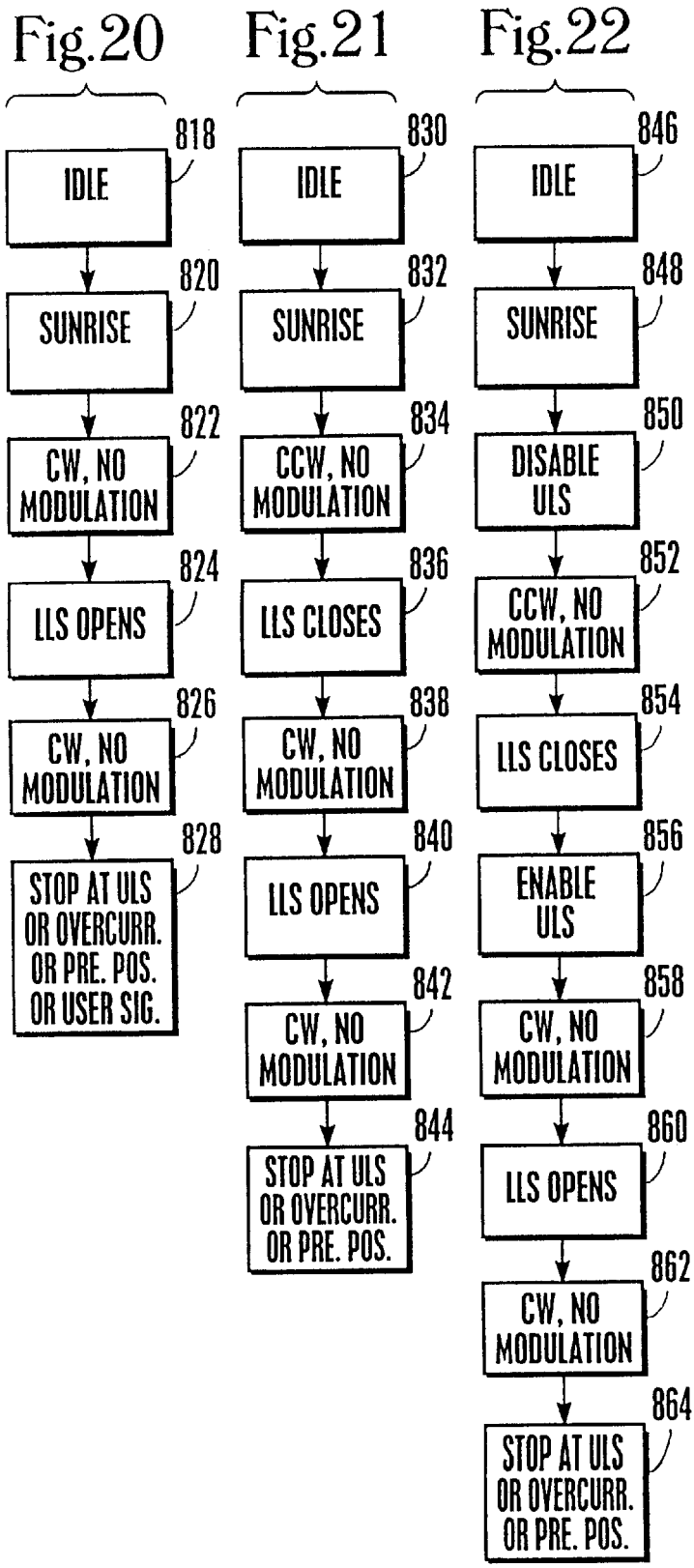

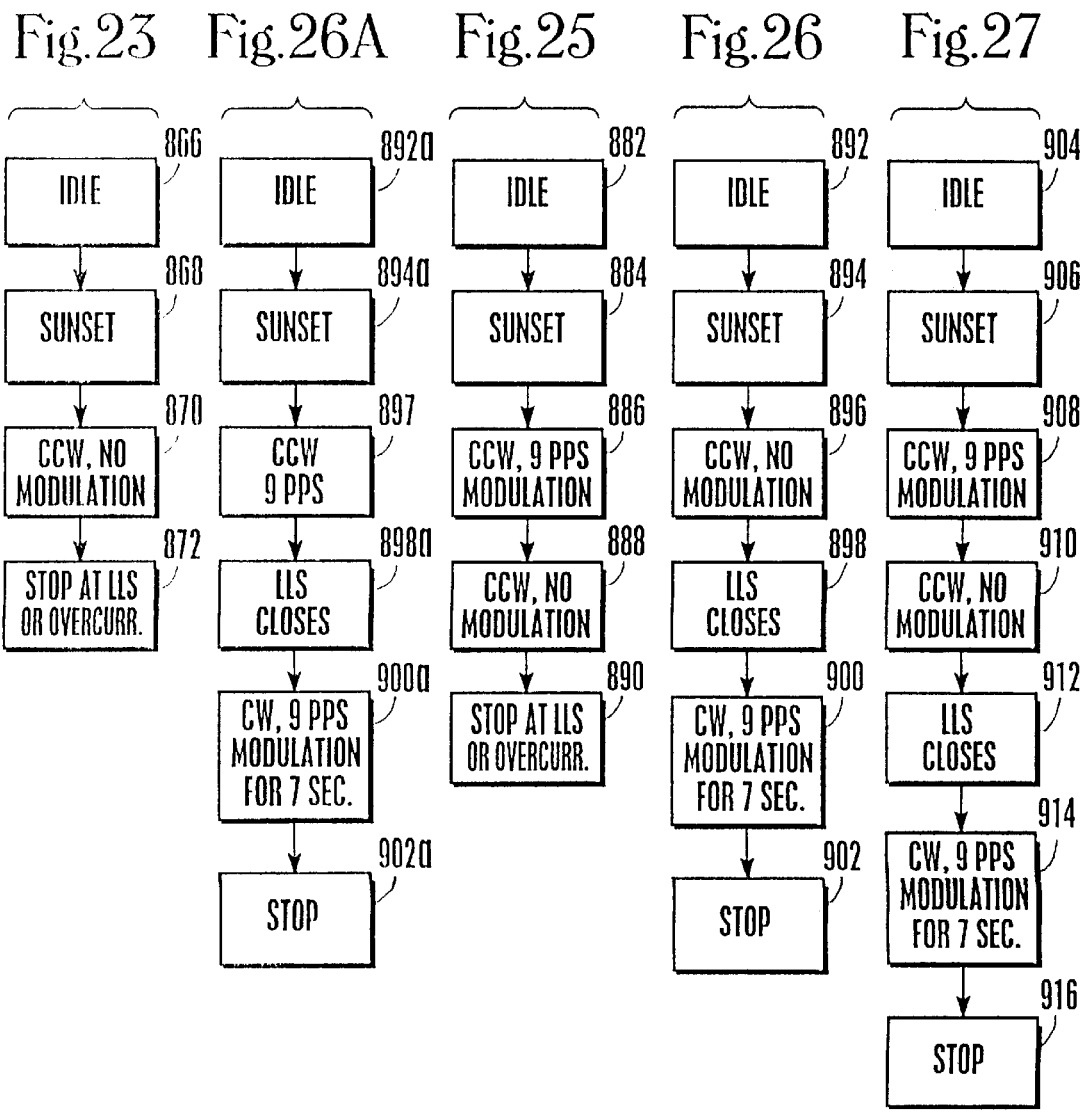

HEAD RAIL-MOUNTED ACTUATOR FOR WINDOW COVERINGS

RELATED APPLICATIONS

This application is a continuation of co-pending allowed application Ser. No. 08/923,812, filed Sep. 4, 1997, which is a CIP of Ser. No. 08/559,467, filed Nov. 15, 1995, now U.S. Pat. No. 5,698,958, which is a CIP of Ser. No. 08/342,130, filed Nov. 18, 1994, now U.S. Pat. No. 5,495,153, which is a CIP of Ser. No. 08/094,570, filed Jul. 20, 1993, now U.S. Pat. No. 5,391,967, which is a CIP of Ser. No. 08/076,556, filed Jun. 11, 1993, now U.S. Pat. No. 5,444,339. Priority is claimed from all of the above documents.

The present application is a continuation-in-part ("CIP") of and claims priority from the following allowed co-pending U.S. patent application: Ser. No. 08/559,467, filed Nov. 15, 1995 for an invention entitled "HEAD RAIL-MOUNTED ACTUATOR FOR ROLL-UP SHADES", incorporated herein by reference.

FIELD OF THE INVENTION

The present invention relates generally to window covering peripherals and more particularly to remotely-controlled window coverings.

BACKGROUND

Louvered blinds, such as Levellor® mini-blinds, are used as window coverings in a vast number of business buildings and dwellings. The typical blind has a number of horizontal elongated parallelepiped-shaped louvers, i.e., rotationally-movable slats, which are collectively oriented with their major surfaces parallel to the ground ("open") to permit light to pass between adjacent slats, or with their major surfaces perpendicular to the ground ("closed"), to block light from passing between adjacent slats, or any intermediate position between open and closed. Stated differently, the slats can be rotated about their respective longitudinal axes, i.e., about respective lines which are parallel to the ground, to open or close the blind. Alternatively, the slats may be oriented vertically for rotation about their respective longitudinal axes (i.e., for rotation about respective lines that are perpendicular to the ground), for opening and closing the blind.

Ordinarily, to provide for movement of the slats of a blind between the open and closed positions, an elongated actuating baton is coupled to structure on the blind such that when the baton is manually rotated about its longitudinal axis, the slats move in unison between the open and closed positions. It will accordingly be appreciated that by proper manual operation of the baton, blinds can be used to effectively regulate the amount of light which passes into the room in which the blind is located. Thus, blinds can be opened during the day to permit sunlight to enter the room, or closed during particularly warm days to prevent overheating of the room. Likewise, blinds can be closed at night for security purposes, and to prevent heat within the room from dissipating through the window into the cool evening air.

While most existing manually-operated blinds accordingly provide an effective means for regulating the amount of light propagating into or out of a room, it is often advantageous to provide for remote or automatic positioning of the blinds. For example, it would be advantageous to provide for the automatic nighttime closing of blinds in a business premises, for both security reasons and energy conservation, rather than to rely on personnel to remember to manually close all blinds before vacating the premises for the evening. Also, remote operation of blinds would enable many invalid persons to regulate the amount of light entering their rooms, without requiring the persons to manually operate the actuating baton.

Not surprisingly, several systems have been introduced for either lowering and raising the slats of a blind, or for moving the slats between the open and closed positions. For example, U.S. Pat. No. 4,644,990 Webb, Sr. et al. teaches a system for automatically moving a set of venetian-type window blinds in response to sensing a predetermined level of sunlight. Likewise, U.S. Pat. No. 3,860,055 to Wild teaches a system for automatically raising or lowering a shutter upon sensing a predetermined level of sunlight. Also, U.S. Pat. No. 4,096,903 to Ringle, III discloses a system for opening a blind, wherein the Ringle, III system is mounted in the head rail of the blind and operates the blind in response to an electromagnetic control signal.

Unfortunately, the systems mentioned above, like many, if not most, automatic blind control systems, are somewhat complicated in operation and cumbersome and bulky in installation, and consequently are relatively expensive. For example, the Webb, Sr. et al. system requires that a housing be mated with the blind structure for holding the various components of the patented system, which includes, inter alia, ratchets, pawls, gears, clutches, levers, and springs. In a similar vein, the Wild invention requires the use of, among other components, a rather bulky gas-driven piston-and-cylinder to raise and lower the shutter. Precisely how the piston-and-cylinder is mounted on an existing shutter assembly is not discussed by Wild. The Ringle, III device consumes a relatively large amount of power to sense its control signal, and thus exhausts its battery quickly, in part because of its relatively complicated limit switch mechanism and because Ringle, III does not provide any electronic signal processing which would enable the Ringle, III device to sense a control signal efficiently, with little power consumption.

Accordingly, it is an object of the present invention to provide a comparatively simple device for opening and closing mini-blinds. It is another object of the present invention to provide a remote control device for opening and closing blinds which is compact and easy to install. Yet another object of the present invention is to provide a device for remotely and automatically opening and closing blinds. Still another object of the present invention is to provide a device for remotely and automatically opening and closing mini-blinds which consumes relatively little power. Further, it is an object of the present invention to provide a device for remotely and automatically opening and closing mini-blinds which is easy to use and cost-effective to manufacture. Another object of the present invention to provide a device for remotely operating vertical blinds and pleated, cellular, and roll-up shades.

SUMMARY OF THE INVENTION

An actuator is disclosed for rotating the actuating baton of a mini-blind to open or close the slats of the mini-blind. Typically, the mini-blind is mounted adjacent a surface, e.g., a window sill.

The actuator of the present invention includes an electric motor which is operably engaged with a coupling, and the coupling is engageable with the baton substantially anywhere along the length of the baton. A housing is provided for holding the motor, and a fastening element is attached to the housing and is connectable to a nearby surface, e.g., the window frame or the head rail of the blind, to prevent relative motion between the surface and the housing. At least one direct current (dc) battery is mounted in the housing and is electrically connected to the motor for selectively energizing the motor to rotate the baton. This at least one battery can be an alkaline battery or a nine volt lithium battery, either one of which is a primary dc battery.

Preferably, the rotor of the motor is connected to a gear assembly, and the gear assembly in turn is connected to the coupling. The coupling has a channel configured for closely receiving the baton. In the presently preferred embodiment, the gear assembly includes a plurality of reduction gears for causing the baton to rotate at a fraction of the angular velocity of the rotor, and a rack gear for operating a limit switch to deactivate the motor when the blind is in a predetermined configuration.

In one presently preferred embodiment, a power switch is mounted in the housing and is electrically connected between the battery and the motor. Preferably, the power switch is an electronic circuit for sensing a control signal with comparatively little expenditure of the battery energy. As intended by the present invention, the power switch has an open configuration, wherein the electrical circuit from the battery to the motor is incomplete, and a closed configuration, wherein the electrical circuit from the battery to the motor is complete.

To provide for remove operation of the actuator, the power switch is moved between the open and closed configuration by a control signal. In one embodiment, this control signal is generated by a daylight sensor which is electrically connected to the switch. The daylight sensor generates the control signal in response to a predetermined amount of light impinging on the daylight sensor.

Additionally, the control signal may be generated by a signal sensor which is electrically connected to the power switch. The signal sensor generates the control signal in response to a user commercial signal. To this end, a hand-held user command signal generator is provided which emits an optical user command signal.

In another aspect of the present invention, a device is disclosed for moving the operator of a window covering having slats to open or close the slats. The device includes an actuator that has an electric motor and a coupling operably engaged with the motor. The coupling contacts the operator to prevent rotational relative motion between the coupling and the operator. A portable source of electrical power is included, and a control signal generator is provided for generating a control signal to cause the source of electrical power to be electrically connected with the actuator for energizing the motor to move the operator.

In yet another aspect of the present invention, a method is disclosed for moving the slats of a mini-blind by rotating the actuating baton of the mini-blind. The method of the present invention includes the steps of providing a motor, a dc battery, and a housing for holding the battery and the motor, and then coupling the rotor or a motor with the baton. Next, the housing is fastened to a nearby surface, e.g., a window sill or the head rail of the blind. Then, a predetermined electromagnetic signal is sensed to cause the battery to energize the motor and thereby rotate the baton.

In still another aspect of the present invention, a device is disclosed for rotating the operating baton of a blind to open and close the blind. As contemplated by the present invention, the device includes an electric motor having a rotor and a direct current battery. A coupling is operably engaged with the motor and is also coupled to the baton for transferring rotational motion of the rotor to the baton. A light sensor generates a signal to complete an electrical circuit between the battery and the motor when light having a predetermined intensity impinges on the sensor. In accordance with the present invention, the light sensor has a dark current equal to or less than about $10^{-5}$ amperes, preferably on the order of a few nanoamperes.

In an alternate embodiment, an actuator is provided for rotating the tilt rod of a blind having a head rail. The actuator includes a coupling which is engageable with the tilt rod such that movement of the coupling causes rotation of the tilt rod. A reversible electric direct current (dc) motor is operably engaged with the coupling to move the coupling, and a dc battery is electrically connected to the motor to energize the motor. In this alternate embodiment, a sensor detects a light signal and generates a control signal in response to the light signal. The control signal is sent to an electronic circuit which is electrically connected to the sensor and the battery for processing the control signal from the sensor to cause the battery to energize the motor. The sensor and circuit are designed to sense the control signal and process the signal in an energy efficient manner to activate the motor, thereby conserving battery energy and maximizing battery useful life.

Preferably, the sensor is a daylight sensor and the control signal is generated by the daylight sensor in response to a predetermined amount of light impinging on the daylight sensor. Additionally, a signal sensor can generate the control signal in response to a suer command signal. To this end, a hand-held user command signal generator can be provided for selectively generating the user command signal.

As intended by the preferred embodiment, the electronic circuit has an edge detector for delaying energization of the motor for a predetermined time period after generation of the control signal by the daylight sensor. In other words, the edge detector prevents operation of the blind in the event that a spurious light signal, e.g., from an automobile headlight, momentarily impinges upon the daylight sensor at night.

Additionally, a manually manipulable adjuster is engaged with the tilt rod. The tilt rod has a closed position, wherein the blind is fully closed, and an open position, wherein the blind is open, and the open position is selectively established by manipulating the adjuster.

In another aspect of the alternate embodiment, a device is disclosed for opening and closing the slats of a window covering of the type having a head rail and an operator disposed wherein the head rail. The device of the present invention includes an actuator which has an electric motor and a coupling operably engaged with the motor, and the coupling contacts the operator to prevent rotational relative motion between the coupling and the operator. A source of electrical power and a control signal generator for generating a control signal are also provided, and an electronic circuit is electrically connected to the control signal generator and the source of electrical power for processing the control signal to cause the source of electrical power to energize the motor to move the operator. Preferably, the electronic circuit includes at least one electronic component that is responsive to the control signal for energizing the actuator.

In yet another aspect of the alternate embodiment, a method is disclosed for moving the slats of a blind by rotating the tilt rod of the blind. In accordance with the method of the present invention, a motor, a dc battery, and an electronic circuit are provided for receiving a control signal and processing the control signal to cause the battery to energize the motor. With this purpose in mind, the rotor of the motor is coupled with the tilt rod, and a predetermined electromagnetic signal is sensed to generate the control signal and cause the electrical circuit between the battery and the motor to be completed to rotate the tilt rod.

In still another aspect of the present invention, an actuator is disclosed which is couplable to an operating component of a blind having an open configuration and a closed configuration. The actuator includes a sensor for detecting a light signal and generating a control signal in response thereto. Also, the actuator includes a coupling that is engageable with the operating component of the blind such that movement of the coupling causes the blind to move toward the open configuration or toward the closed configuration. A reversible electric direct current (dc) motor is operably engaged with the coupled to move the coupling, and a dc battery is provided for energizing the motor.

Furthermore, an electronic circuit is electrically connected to the light sensor and to the battery. As intended by the present invention, the electronic circuit processes the control signal from the light sensor to cause the battery to energize the motor. The electronic circuit advantageously includes an edge detector for delaying energization of the motor for a predetermined time period after generation of the control signal by the sensor.

In still another alternative embodiment of the present invention, a window blind actuator includes a window covering having a head rail, a rod rotatably mounted in the head rail and defining a first axis of rotation, and a plurality of slats. Each slat is connected to the rod and each slat defines a second axis of rotation oriented substantially perpendicularly to the first axis of rotation. Rotation of the rod about the first axis causes rotation of the slats about the respective second axes.

A sensor is provided for detecting a light signal and generating a control signal in response thereto. Also, a coupling is engageable with the rod such that movement of the coupling causes rotation of the rod. Further, a reversible electric direct current (dc) motor is operably engaged with the coupling to move the coupling, and a dc battery is electrically connected to the motor. An electronic circuit is electrically connected to the light sensor and the battery for processing the control signal from the light sensor to cause the battery to energize the motor.

Preferably, at least a first travel limiter is positioned in the head rail to cause the motor to be deenergized when the rod reaches a predetermined position. Moreover, a limit switch is electrically connected to the electronic circuit and is positioned adjacent the first travel limiter, so that the first travel limiter can contact the limit switch and thereby cause the electronic circuit to deenergize the motor. Desirably, a second travel limiter is positioned in the head rail for contacting the limit switch, so that the second travel limiter can contact the limit switch and thereby cause the electronic circuit to deenergize the motor. Or, an overcurrent sensor can be used to stop the motor at its limits of travel.

In one preferred embodiment, the electronic circuit includes a switch electrically connected to the sensor for receiving the control signal and activating the electronic circuit in response thereto to permit the circuit to cause the battery to energize the motor to rotate the rod. As envisioned by the present invention, the electronic circuit is deactivated in the absence of the control signal. The switch can preferentially be an electronic trigger or a transistor.

In accordance with the preferred embodiment, a plurality of connectors are attached to respective slats. Each connector includes a rod element which is surroundingly engaged with the rod, and rotation of the rod causes rotation of the rod element about the first axis of rotation. Additionally, a slat element is threadably engaged with the rod element and is fixedly attached to the respective slat, such that rotation of the rod element about the first axis of rotation causes rotation of the slat element and slat about the second axis of rotation.

In another aspect of the alternate embodiment just described, a window blind operating device includes a window covering of the type having a head rail defining a long axis, a rod disposed therein, and a plurality of elongated slats, each slat defining a long axis, each slat depending downwardly from the head rail such that the long axis of each slat is perpendicular to the long axis of the head rail. Rotation of the rod causes the slats to rotate.

An actuator includes an electric motor and a coupling operably engaged with the motor to engage the motor with the rod for rotating the rod. Also, a source of electrical power is provided, and a control signal generator generates a control signal. Moreover, an electronic circuit is electrically connected to the control signal generator and to the source of electrical power for processing the control signal to cause the source of electrical power to energize the motor to move the rod.

In still another embodiment, a window blind actuator includes a pleated shade having a head rail, a rod rotatably mounted in the head rail, and a plurality of sections including a bottom-most section distanced from the head rail and connected thereto. Rotation of the rod causes translational motion of at least the bottom-most section relative to the head rail. A sensor is provided for detecting a light signal and generating a control signal in response thereto. Also, a coupling is engageable with the rod such that movement of the coupling causes rotation of the rod, and a reversible electric direct current (dc) motor is operably engaged with the coupling to move the coupling. A dc battery is electrically connected to the motor and an electronic circuit is electrically connected to the light sensor and the battery for processing the control signal from the light sensor to cause the battery to energize the motor. This at least one battery can be an alkaline battery or a lithium battery. In either case, it is a primary dc battery.

In another aspect of the embodiment just described, a shade operating device includes a head rail, a rod disposed therein, and an accordion-type window covering engaged with the rod for moving the window covering between a raised configuration and a lowered configuration when the rod is rotated. An actuator includes an electric motor and a coupling operably engaged with the motor to engage the motor with the rod for rotating the rod. Also, the device includes a source of electrical power, and a control signal generator for generating a control signal. Further, the device includes an electronic circuit electrically connected to the control signal generator and the source of electrical power for processing the control signal to cause the source of electrical power to energize the motor to move the rod.

Yet another embodiment of the present invention is disclosed herein in which the window covering control system is associated with a roll-up shade. The shade includes a head rail, a tube rotatably disposed therein, and a window covering engaged with the tube for moving the window covering between a raised configuration and a lowered configuration when the tube is rotated. An electric motor is engaged with a coupling to engage the motor with the tube for rotating the tube, and at least one dc battery that is the sole source of energy is associated with the window covering. A control signal generator is provided for generating a control signal, and an electronic circuit is electrically connected to the control signal generator and the battery for processing the control signal to cause the at least one battery to energize the motor to move the tube. Per the present invention, the electronic circuit has at least one of: a pulse mode for energizing the motor in pulses, and a continuous mode for continuously energizing the motor.

The details of the present invention, both as to its construction and operation, can best be understood in reference to the accompanying drawings, in which like numerals refer to like parts, and which:

BRIEF DESCRIPTION OF THE DRAWINGS

FIG. 1 is a perspective view of the actuator of the present invention, shown in one intended environment;

FIG. 2 is another perspective view of the actuator of the present invention, shown in one intended environment;

FIG. 3 is an exploded view of the actuator of the present invention;

FIG. 15 is a flow chart showing the steps of a preferred controller for opening a window covering in a lift only mode, with no predetermined position programmed;

FIG. 16 is a flow chart showing the steps of a preferred controller for opening a window covering in a lift and tilt mode, with no predetermined position programmed;

FIG. 17 is a flow chart showing the steps of a preferred controller for opening a window covering in a lift and tilt mode, with a predetermined position programmed, starting from the window covering being fully closed;

FIG. 18 is a flow chart showing the steps of a preferred controller for opening a window covering in a lift and tilt mode, with a predetermined position programmed, starting from the window covering being intermediate the fully closed and fully open positions;

FIG. 19 is a flow chart showing the steps of a preferred controller for opening a window covering in a lift and tilt mode, with a predetermined position programmed, starting from the window covering being fully open;

FIG. 20 is a flow chart showing the steps of a preferred controller for opening a window covering in a lift mode, with a predetermined position programmed, starting from the window covering being fully closed;

FIG. 21 is a flow chart showing the steps of a preferred controller for opening a window covering in a lift mode, with a predetermined position programmed, starting from the window covering being intermediate the fully closed and fully open positions;

FIG. 22 is a flow chart showing the steps of a preferred controller for opening a window covering in a lift mode, with a predetermined position programmed, starting from the window covering being fully open;

FIG. 23 is a flow chart showing the steps of a preferred controller for closing a window covering, starting from the window covering being at the fully open position;

FIG. 25 is a flow chart showing the steps of a preferred controller for closing a window covering in a lift and tilt mode, starting from the window covering being intermediate the fully open and fully closed positions;

FIG. 26 is a flow chart showing the steps of a preferred controller for closing a window covering in a lift and tilt mode, starting from the window covering being at the fully open position after having been moved;

FIG. 26a is a flow chart showing the steps of a preferred controller for closing a window covering in a lift and tilt mode, starting from the window covering being at the fully open position after having been moved; and FIG. 27 is a flow chart showing the steps of a preferred controller for closing a window covering in a lift and tilt mode, starting from the window covering being intermediate the fully open and fully closed positions after having been moved.

DETAILED DESCRIPTION OF THE PREFERRED EMBODIMENT

Figure 4:
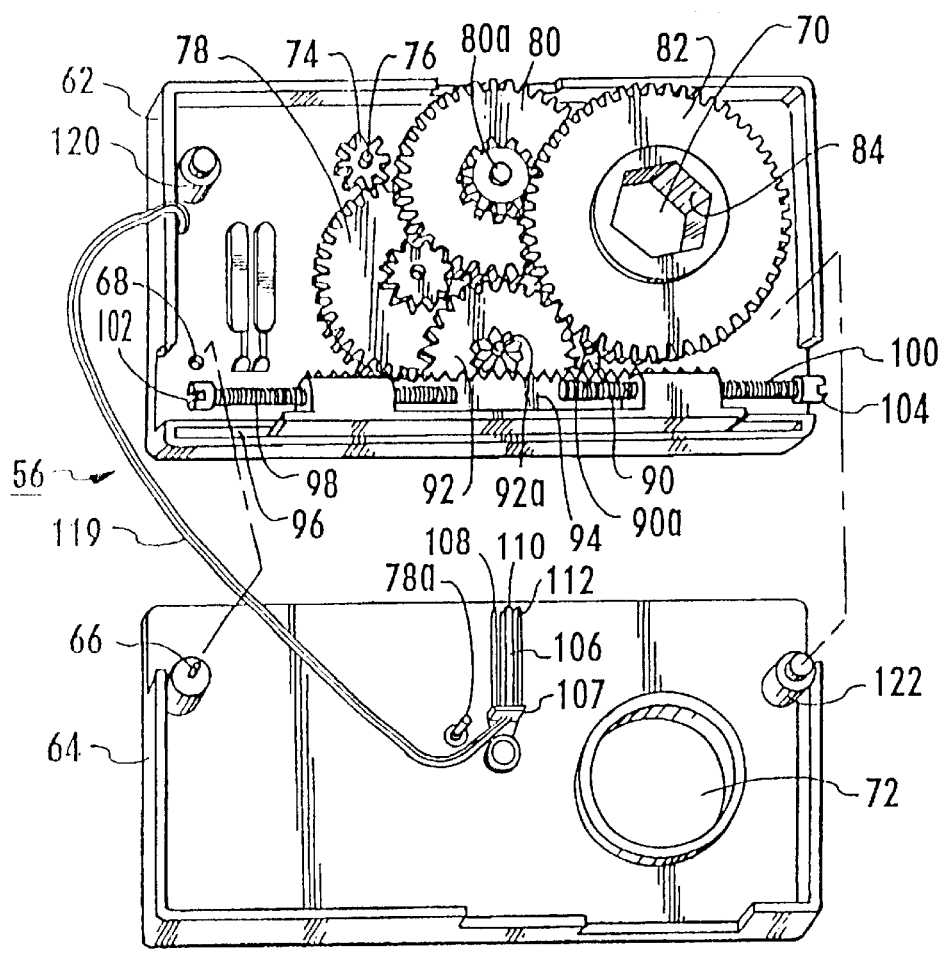
FIG. 4 is a perspective view of the gear assembly of the actuator of the present invention, with portions broken away.

Referring initially to FIG. 1, an actuator is shown, generally designated 10. As shown, the actuator 10 is in operable engagement with a rotatable operating baton 12 of a mini-blind 14 having a plurality of louvered slats 16.

In the embodiment shown, the mini-blind 14 is a Levellor®-type mini-blind which is mounted on a window frame 18 to cover a window 20, and the baton 12 is rotatable about its longitudinal axis. When the baton 12 is rotated about its longitudinal axis, each of the slats 16 is caused to rotate about its respective longitudinal axis to move the mini-blind 14 between an open configuration, wherein a light passageway is established between each pair of adjacent slats, and a closed configuration, wherein no light passageways are established between adjacent slats.

While the embodiment described above discusses a mini-blind, it is to be understood that the principles of the present invention apply to a wide range of window coverings that have louvered slats.

As can be appreciated in reference to FIG. 1, the baton 12 has a hexagonally-shaped transverse cross-section, and the baton 12 is slidably engageable with a channel 22 of the actuator 10. Accordingly, the actuator 10 can be slidably engaged with the baton 12 substantially anywhere along the length of the baton 12.

FIG. 2 shows that the actuator 10 includes a fastening element, preferably a clip 23, for fastening the actuator 10 to a head rail 24 of the mini-blind 14. In the embodiment shown, the clip 23 engages the head rail 24 in a close interference fit to hold the actuator 10 onto the head rail 24. A support 25 is connected to or molded integrally with the actuator 10, and the support 25 extends below the head rail 24 and above the top slat 16a of the blind 14 to laterally support the actuator 10.

Alternatively, the actuator 10 can be fastened to the window frame 18. In such an embodiment, a strip of tape (not shown) having adhesive material on both its opposed major surfaces is adhered to a portion of the actuator 10, and when the actuator 10 is gently pressed against the window frame 18, the tape adheres to the window frame 18 to fasten the actuator 10 to the window frame 18. It is to be understood that the actuator 10 alternatively may be attached to the frame 18 by bolts, screws, glue, nails, or other well-known fasteners.

In cross-reference to FIGS. 2 and 3, the actuator 10 has a rigid solid plastic light pipe 26 which, when the actuator 10 is mounted on the window frame 18 as shown, extends between the window 20 and the mini-blind 14. Accordingly, a light passageway is established by the light pipe 26 from the window 20 to the actuator 10. To facilitate the transmission of light through the light pipe 26, the light pipe 26 has an end 27 which has a relatively rough, e.g., thirty micron (30 $\mu$) finish, while the remainder of the surface of the light pipe 26 has a three micron (3 $\mu$) finish. It will be appreciated in reference to FIGS. 1 and 2 that the light pipe 26 also provides lateral support to the actuator 10, in the same manner as provided by the support 25.

A control signal generator, preferably a daylight sensor 28 (shown in phantom in FIG. 3) is mounted on the actuator 10 by means well-known in the art, e.g., solvent bonding. In accordance with the present invention, the daylight sensor 28 is in light communication with the light guide 26. Also, the sensor 28 is electrically connected to electronic components within the actuator 10 to send a control signal to the components, as more fully disclosed below. Consequently, with the arrangement shown, the daylight sensor 28 can detect light that propagates through the window 20, independent of whether the mini-blind 14 is in the open configuration or the closed configuration.

Further, the actuator 10 includes another control signal generator, preferably a signal sensor 29, for receiving an optical, preferably visible red modulated user command signal. Preferably, the user command signal is generated by a hand-held user command signal generator 31. In one presently preferred embodiment, the generator 31 generates a pulsed optical signal having a period of between about fifteen hundred microseconds and five thousand microseconds (1500 $\mu$s–5000 $\mu$s). In a presently preferred embodiment, however, the pulsed optical signal has a frequency of four to eight kiloHertz.

Like the daylight sensor 28, the signal sensor 29 is electrically connected to electronic components within the actuator 10. As discussed in greater detail below, either one of the daylight sensor 28 and signal sensor 29 can generate an electrical control signal to activate the actuator 10 and thereby cause the mini-blind 14 to move toward the open or closed configuration, as appropriate.

Preferably, both the daylight sensor 28 and signal sensor 29 are light detectors such as photo diodes which have low dark currents, to conserve power when the actuator 10 is deactivated. More particularly, in the absence of light the sensors 28, 29 have dark currents equal to or less than about $10^{-8}$ amperes and preferably equal to or less than about $2 \times 10^{-9}$ amperes. In the presently preferred embodiment, the daylight sensor 28 and signal sensor 29 are selected double-end type phototransistors made by Sharp Electronics, part no. PT 460.

Referring now to FIG. 3, the actuator 10 includes a hollow, generally parallelpiped-shaped lightweight metal or molded plastic clamshell housing 30. As shown, the housing 30 has a first half 32 which is snappingly engageable with a second half 34. Alternatively, the first half 32 of the housing 30 can be glued or bolted to the second half 34. Two openings 36, 38 are formed in the housing 30 to establish the channel 22 shown in FIG. 1. As also shown in FIGS. 1 and 3, the housing 30 has a slightly convex front surface 39.

As shown best in FIG. 3, a molded plastic battery carriage 40 is positioned within the housing 30. Preferably, the battery carriage 40 generally conforms to the inside contour of the housing 30, i.e., the housing 30 "captures" the battery carriage 40 and holds the carriage 40 stationary within the housing 30.

A power supply 42 is mounted in the battery carriage 40. In the preferred embodiment, the power supply 42 includes four type AA direct current (dc) alkaline batteries 44, 46, 48, 50. The batteries 44, 46, 48, 50 are mounted in the battery carriage 40 in electrical series with each other by means well-known in the art. For example, in the embodiment shown, each of the batteries 44, 46, 48, 50 is positioned between respective positive and negative metal clips 45 to hold the batteries 44, 46, 48, 50 within the carriage 40 and to establish an electrical path between the batteries 44, 46, 48, 60 and their respective clips. Alternatively, the present invention can use a single-cell lithium battery or batteries. In either case, the batteries are primary dc batteries.

FIG. 3 further shows that an electronic circuit board 52 is positioned in the housing 30 adjacent the battery carriage 40. It is to be understood that an electrical path is established between the battery clips and the electronic circuit board. Consequently, the batteries 44, 46, 48, 50 are electrically connected to the electronic circuit board 52. The electronic components of the circuit board 52 are discussed in more detail in reference to FIG. 7 below.

Still referring to FIG. 3, a lightweight metal or molded plastic gear box 56 is attached to or formed integrally with the battery carriage 40. The gear box 56 is formed with a gear box opening 58 for receiving the baton 12 therein.

FIG. 3 also shows that a small, lightweight electric motor 60 is attached to the gear box 56, preferably by bolting the motor 60 to the gear box 56. In the presently preferred embodiment, the motor 60 is a direct current (dc) motor, type FC-130-10300, made by Mabuchi Motor America Corp. of New York. As more fully disclosed in reference to FIG. 4 below, the gear box 56 holds a gear assembly which causes the baton 12 to rotate at a fraction of the angular velocity of the motor 60. As further discussed below more fully in reference to FIG. 7, the motor 60 can be energized by the power supply 42 through the circuit board 52.

Now referring to FIGS. 4, 5A, 5B, and 6, the details of the gear box 56 can be seen. As shown best in FIG. 4, the gear box 56 includes a plurality of lightweight metal or molded plastic gears, i.e., a gear assembly, and each gear is rotatably mounted within the gear box 56. In the presently preferred embodiment, the gear box 56 is a clamshell structure which includes a first half 62 and a second half 64, and the halves 62, 64 of the gear box 56 are snappingly engageable together by means well-known in the art. For example, in the embodiment shown, a post 66 in the second half 64 of the gear box 56 engages a hole 68 in the first half 62 of the gear box 56 in an interference fit to hold the halves 62, 64 together.

Each half 62, 64 includes a respective opening 70, 72, and the openings 70, 72 of the gear box 56 establish the gear box opening 58 (FIG. 3) and are coaxial with the channel 22 of the housing 30 for slidably receiving the baton 12 therethrough.

As shown in FIG. 4, a motor gear 74 is connected to the rotor 76 of the motor 60. In turn, the motor gear 74 is engaged with a first reduction gear 78, and the first reduction gear 78 is engaged with a second reduction gear 80.

As also shown in FIG. 4, the second reduction gear 80 is engaged with a main reduction gear 82. To closely receive a hexagonally-shaped baton, the main reduction gear 82 has a hexagonally-shaped channel 84. As intended by the present invention, the channel 84 of the main reduction gear 82 is coaxial with the openings 70, 72 (and, thus, with the gear box opening 58 of the gear box 56 shown in FIG. 3). Consequently, the channel 84 of the main reduction gear 82 is also coaxial with the channel 22 of the housing 30, for receiving the baton 12 therethrough.

It can be appreciated in reference to FIG. 4 that when the main reduction gear 82 is rotated, and the baton 12 is engaged with the channel 84 of the main reduction gear 82, the sides of the channel 84 contact the baton 12 to prevent rotational relative motion between the baton 12 and the main reduction gear 82. Further, the reduction gears 78, 80, 82 cause the baton 12 to rotate at a fraction of the angular velocity of the motor 60. Preferably, the reduction gears 78, 80, 82 reduce the angular velocity of the motor 60 such that the baton 12 rotates at about one revolution per second.

It is to be understood that the channel 84 of the main reduction gear 82 can be other shapes suitable for conforming to the shape of the particular baton being used. For example, for a baton (not shown) having a circular transverse cross-sectional shapes, the channel 84 will have a circular cross-section. In such an embodiment, a set screw (not shown) is threadably engaged with the main reduction gear 82 for extending into the channel 84 to abut the baton and hold the baton stationary within the channel 84. In other words, the gears 74, 78, 80, 82 described above establish a coupling which operably engages the motor 60 with the baton 12.

Figure 5A:
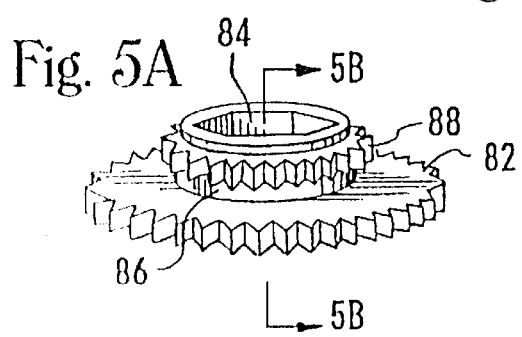
FIG. 5A is a perspective view of the main reduction gear of the actuator of the present invention.
Figure 5B:
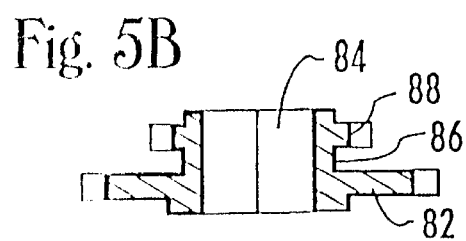
FIG. 5B is a cross-sectional view of the main reduction gear of the actuator of the present invention, as seen along the line 5B—5B in FIG. 5A.

In cross-reference to FIGS. 4, 5A, and 5B, the main reduction gear 82 is formed on a hollow shaft 86, and the shaft 86 is closely received within the opening 70 of the first half 62 of the gear box 56 for rotatable motion therein. Also, a first travel limit reduction gear 88 is formed on the shaft 86 of the main reduction gear 82. The first travel limit reduction gear 88 is engaged with a second travel limit reduction gear 90, and the second travel limit reduction gear 90 is in turn engaged with a third travel limit reduction gear 92.

FIG. 4 best shows that the third travel limit reduction gear 92 is engaged with an elongated motion translating element that changes rotational motion to translational motion. In the embodiment shown, the motion translating element is a linear rack gear 94, although other motion translating elements, e.g., a lead screw with travelling nut, may be used. Thus, the main reduction gear 82 is coupled to the rack gear 94 through the travel limit reduction gears 88, 90, 92, and the rotational speed (i.e., angular velocity) of the main reduction gear 82 is reduced through the first, second, and third travel limit reduction gears 88, 90, 92. Also, the rotational motion of the main reduction gear 82 is translated into linear motion by the operation of the third travel limit reduction gear 92 and rack gear 94.

FIG. 4 shows that the second reduction gear 80 and second and third travel limit reduction gears 90, 92 are rotatably engaged with respective metal post axles 80a, 90a, 92a which are anchored in the first half 62 of the gear box 56. In contrast, the first reduction gear 78 is rotatably engaged with a metal post axle 78a which is anchored in the second half 64 of the gear box 56.

Still referring to FIG. 4, the rack gear 94 is slidably engaged with a groove 96 that is formed in the first half 62 of the gear box 56. First and second travel limiters 98, 100 are connected to the rack gear 94. In the embodiment shown, the travel limiters 98, 100 are threaded, and are threadably engaged with the rack gear 94. Alternatively, travel limiters (not shown) having smooth surfaces may be slidably engaged with the rack gear 94 in an interference fit therewith, and may be manually moved relative to the rack gear 94.

As yet another alternative, travel limiters (not shown) may be provided which are formed with respective detents (not shown). In such an embodiment, the rack gear is formed with a channel having a series of openings for receiving the detents, and the travel limiters can be manipulated to engage their detects with a preselected pair of the openings in the rack gear channel. In any case, it will be appreciated that the position of the travel limiters of the present invention relative to the rack gear 94 may be manually adjusted.

FIG. 4 shows that each travel limiter 98, 100 has a respective abutment surface 102, 104. In cross-reference to FIGS. 4 and 6, the abutment surfaces 102, 104 can contact a reed switch 106 which is mounted on a base 107. The base 107 is in turn anchored on the second half 64 of the gear box 56. As intended by the present invention, the reed switch 106 includes electrically conductive, preferably beryllium-copper first and second spring arms 108, 112 an and electrically conductive, preferably beryllium-copper center arm 110. As shown, one end of each spring arm 108, 112 is attached to the base 107, and the opposite ends of the spring arms 108, 112 can move relative to the base 107. As also shown, one end of the center arm 110 is attached to the base 107.

When the main reduction gear 82 has rotated sufficiently counterclockwise, the abutment surface 102 of the first travel limiter 98 contacts the first spring arm 108 of the reed switch 106 to urge the first spring arm 108 against the stationary center arm 110 of the reed switch 106. On the other hand, when the main reduction gear 82 has rotated clockwise a sufficient amount, the abutment surface 104 of the second travel limiter 100 contacts the second spring arm 112 of the reed switch 106 to urge the second spring arm 112 against the stationary center arm 110 of the reed switch 106.

Figure 6:
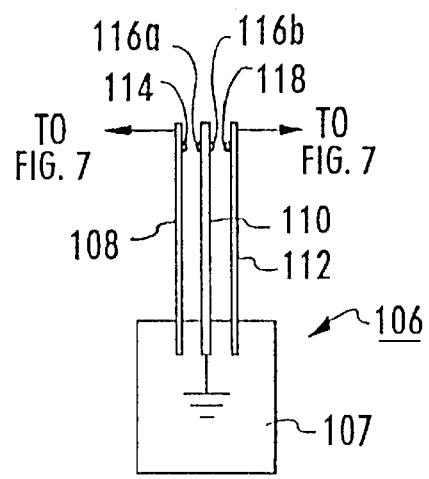
FIG. 6 is a perspective view of the reed switch of the actuator of the present invention.

FIG. 6 best shows that an electrically conductive, preferably gold-plated contact 114 is deposited on the first spring arm 108, and electrically conductive, preferably gold-plated contacts 116a, 116b are deposited on opposed surfaces of the center arm 110. Also, an electrically conductive, preferably gold-plated contact 118 is deposited on the second spring arm 112.

Thus, when the first spring arm 108 is urged against the center arm 110, the contact 114 of the first spring arm 108 contacts the contact 116a of the center arm 110 to complete an electrical circuit. On the other hand, when the second spring arm 112 is urged against the center arm 110, the contact 118 of the second spring arm 112 contacts the contact 116b of the center arm 110 to complete an electrical circuit. It can be appreciated in reference to FIG. 4 that the reed switch 106 is electrically connected to the circuit board 52 (FIG. 3) via an electrical lead 119.

As more fully disclosed below in reference to FIG. 7, the completion of either one of the electrical circuits discussed above causes the motor 60 to deenergize and consequently stops the rotation of the main reduction gear 82 and, hence, the rotation the baton 12. Stated differently, the travel limiters 98, 100 may be manually adjusted relative to the rack gear 94 as appropriate for limiting the rotation of the baton 12 by the actuator 10.

Referring briefly back to FIG. 4, spacers 120, 122 may be molded onto the halves 62, 64 for structural stability when the halves 62, 64 of the gear box 56 are snapped together.

Figure 7:
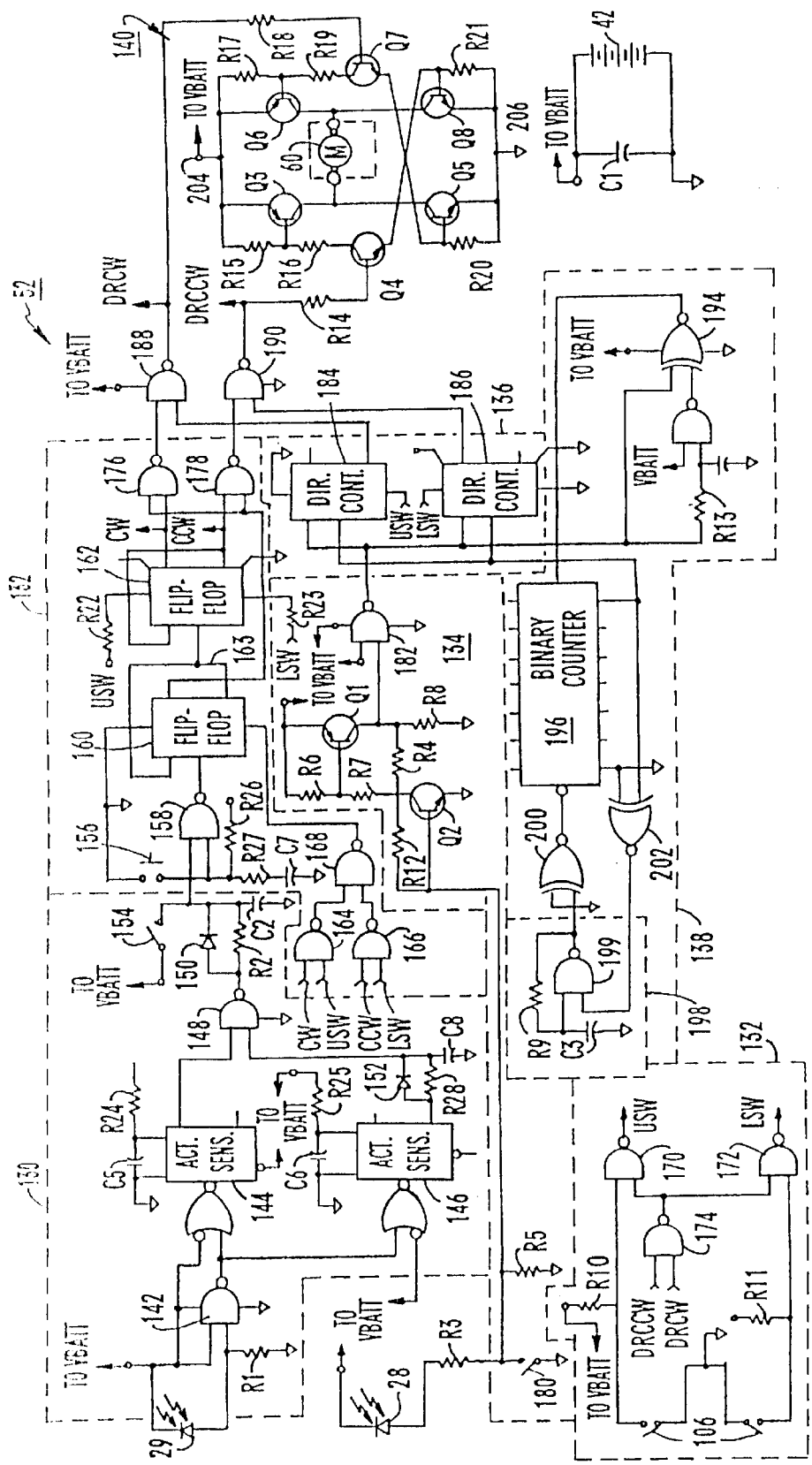
FIG. 7 is a schematic diagram of the electronic circuitry of the actuator of the present invention.

Now referring to FIG. 7, the details of the electrical circuitry contained on the circuit board 52 may be seen. It is to be understood that the circuitry described herein may be implemented by means of an integrated circuit chip in accordance with principles well-known in the art. In overview, the electrical circuit board 52 includes a pulse modulation detector 130 and a beam and manual direction controller 132 for processing the user command signal generated by the user command signal generator 31 and sensed by the signal sensor 29 (FIG. 1) for opening and closing the blind 14. Also, to operate the blind 14 in response to a predetermined level of sunlight as sensed by the daylight sensor 28 (FIG. 3), the circuit board 52 includes a daylight detector 134, a daylight direction controller 136, and an edge detector 138. The edge detector 138 prevents operation of the blind 14 in response to spurious light signals, e.g., automobile headlights. Additionally, the circuit board 52 has an output amplifier 140 for powering the motor 60 shown in FIG. 3.

For clarity of disclosure, the discussion below focusses on the salient components of the electrical circuit board 52. Table 1 below, however, sets forth the values of all of the resistors and capacitors of the circuit board 52 of the preferred embodiment.

FIG. 7 shows that the pulse modulation detector 130 includes a switch, preferably a first type 4093 Schmidt trigger 142 that is electrically connected to the signal sensor 29 for receiving the pulse modulated detection signal therefrom. From the first trigger 142, the signal is sent to first and second stages 144, 146 of a type 4538 activity sensor, and from thence to a first type 4093 NAND gate 148. The NAND gate 148 functions as an inverted AND gate, generating a FALSE signal output signal from two TRUE input signals and a TRUE signal output otherwise, From the NAND gate 148, the signal is set through a first type 1N4148 diode 150 to a capacitor C2. Also, from the second stage 146, the signal is sent through a second type 1N4148 diode 152 to a capacitor C8.

When the first trigger 142 senses a pulsed optical signal from the signal sensor 29, the first trigger 142 generates an output signal having the same pulse rate as the optical signal from the signal sensor 29. When the output signal of the trigger 142 has a pulse rate such that the period between pulses is greater than 5000 $\mu$s, the output signal of the first stage 144 pulses FALSE. Consequently, the output of the NAND gate 148 pulses TRUE. A pulse TRUE output from the NAND gate 148 maintains a steady positive voltage on the capacitor C2. A more fully discussed below, when a positive voltage is maintained on the capacitor C2, energization of the motor 60 is prevented.

Additionally, when the output signal of the first trigger 142 has a pulse rate such that the period between pulses is less than fifteen hundred microseconds (1500 $\mu$s), the output signal of the second stage 146 will be FALSE, no longer containing TRUE pulses. Consequently, the capacitor C8 discharges, which causes the input signal of the NAND gate 148 from the second stage 146 to become FALSE. In response, the output of the NAND gate 148 is TRUE, which, as discussed above, maintains a positive voltage on the capacitor C2 to prevent energization of the motor 60.

In contrast, when the output signal of the first trigger 142 has a pulse rate between fifteen hundred microseconds and five thousand microseconds (1500 $\mu$s–5000 $\mu$s) (i.e., 200 pulses per second to 667 pps, indicating reception by the signal sensor 29 of a proper optical control signal having a pulse rate of between 1500 $\mu$s–5000 $\mu$s), the output signals of both the first and second stages 144, 145 are TRUE. In turn, the output signal of the first NAND gate 148 is FALSE, permitting the capacitor C2 to discharge and thereby permit energization of the motor 60.

The skilled artisan will appreciate that the values of R2 and C2 are selected to require that the output signal of the first NAND gate 148 remains FALSE for at least three hundred thirty milliseconds (330 ms) before the capacitor C2 fully discharges to enable energization of the motor 60. The skilled artisan will further appreciate that when a two-position switch 154 having an "ON" position and an "OFF" position (FIGS. 1 and 7) is manually moved to the "ON" position, voltage from the power supply 42 is conducted to the capacitor C2 to prevent the automatic energization of the motor 60 described above. The motor 60 may nevertheless be energized when the two-position switch 154 is in the "ON" position, however, by manually depressing a thumbswitch 156 (FIGS. 1 and 7), as more fully disclosed below.

FIG. 7 shows that the beam and manual direction controller 132 includes a second type 4093 NAND gate 158, the input signal of which is the output signal of the first NAND gate 148. Upon receipt of a "FALSE" input signal form the first NAND gate 148 (indicating reception by the signal sensor 29 of a proper optical control signal having a pulse rate of between 200 pps–667 pps for at least 330 ms), the second NAND gate 158 generates an output clocking signal. Also, FIG. 7 shows that when the thumbswitch 156 is depressed, a "FALSE" input signal is sent to the second NAND gate 158, and an output clocking signal is consequently generated by the NAND gate 158.

If desired, the circuit shown in FIG. 7 can be implemented using equivalent circuitry on an integrated circuit (IC) chip. In such an embodiment, shown in Appendix A, the pulse rate can be 3000 pps to 10,000 pps, or 4000 pps to 8000 pps.

The output clocking signal of the second NAND gate 158 is sent in turn to a type 4013 "D" motor run flip-flop 160. As shown in FIG. 7, the flip-flop 160 is in the so-called "toggle" configuration (i.e., pin "inverse Q" of the flip-flop 160 is electrically connected to its pin "D"). Accordingly, the flip-flop 160 changes state each time it receives a clocking signal.

FIG. 7 shows that the motor run flip-flop 160 is electrically connected to a type 4013 "D" motor direction flip-flop 162. Like the motor run flip-flop 160, the motor direction flip-flop 162 is in the "toggle" configuration.

In accordance with the present invention, the motor run flip-flop 160 generates either a "motor run" or "motor stop" output signal, while the motor direction flip-flop 162 generates either a "clockwise" or "counterclockwise" output signal. As discussed above, each time the motor run flip-flop 160 receives a clocking signal, it changes state. Also, each time the motor run flip-flop 160 is reset to a "stop motor" state, it toggles the motor direction flip-flop 162 via a line 163 to change state.

Thus, with the motor direction flip-flop 162 initially in the clockwise state, to cause the motor run flip-flop 160 to generate a "motor run" output signal, the user signal generator 31 (FIG. 1) is manipulated to generate a first user command signal (or the thumbswitch 156 is depressed). Then, to cause the motor run flip-flop 160 to generate a "motor stop" output signal, the user signal generator 31 is manipulated to generate a second user command signal (or the thumbswitch 156 is again depressed).

Upon receiving the second clocking signal, the motor run flip-flop 160 toggles the motor direction flip-flop 162 to change state (i.e., to counterclockwise). Then, manipulation of the user signal generator 31 to generate yet a third user command signal (or again depressing the thumbswitch 156) causes the motor run flip-flop to generate a "motor run" signal. Yet a fourth signal cause the motor 60 to again stop, and so on.

Additionally, the state of the motor run flip-flop 160 is caused to change when the motor 60 reaches its predetermined clockwise or counterclockwise limits of travel, as established by the positions of the travel limiters 98, 100 relative to the rack gear 94 (FIG. 4). This prevents continued energization of the motor 60 after the motor 60 has reached a travel limit, as sensed by the reed switch 106.

In describing this means of changing the state of the motor run flip-flop 160 in response to travel motion limitations, the motor direction flip-flop 162 generates either a clockwise ("CW") output signal or a counterclockwise ("CCW") output signal, as mentioned above and indicated in FIG. 7 via the lines CW and CCW. In the presently preferred embodiment, clockwise rotation of the motor 60 corresponds to opening the blind 14, while counterclockwise rotation of the motor 60 corresponds to closing i.e., shutting, the blind 14.

In further disclosing the cooperation of the motor direction flip-flop 162 with the motor run flip-flop 160, the "CW" output signal of the motor direction flip-flop 162 is sent to a first type 4093 limit switch NAND gate 164, whereas the "CCW" output signal of the motor direction flip-flop 162 is sent to a second type 4093 limit switch NAND gate 166. The output signals of the first and second limit switch NAND gates 164, 166 are set in turn in a third type 4093 limit switch NAND gate 168, and the output signal of the third limit switch NAND gate 168 is sent to the motor run flip-flop 160.

FIG. 7 also shows that the first and second limit switch NAND gates 164, 166 receive respective upper limit reached ("USW") and lower limit reached ("LSW") input signals. As shown in FIG. 7, the "USW" signal is generated by a type 4093 USW NAND gate 170, and the "LSW" signal is generated by a type 4093 LSW NAND gate 172.

Both NAND gates 170, 172 receive input signals from a type 4093 direction NAND gate 174. In turn, the direction NAND gate 174 receives an input signal indicating the direction of actual rotation of the motor 60 (i.e., the "motor run CW" signal or the "motor run CCW" signal. In FIG. 7, the "motor run CW" signal has been designated "DRCW", and the "motor run CCW" signal has been designated "DRCCW", and the generation of both the "DRCW" and "DRCCW" signals is discussed more fully below.

The output signal of the direction NAND gate 174 is always "TRUE", unless it senses that the motor 60 has been simultaneously given both a "motor run CW" ("DRCW") signal and a "motor run CCW" ("DRCCW") signal, in which case the output signal of the direction NAND gate is "FALSE". Thus, the "DRCCW" and "DRCW" signals are gated as described above to prevent damaging the output amplifier 140 if the motor 60 is erroneously commanded to simultaneously rotate in both the clockwise and counterclockwise directions.

Additionally, the USW NAND gate 170 receives an input signal from the reed switch 106 when the abutment surface 102 of the travel limiter 98 (FIG. 4) urges the first arm 108 against the center arm 110 of the switch 106, indicating that the rack gear 94 (and, hence, the motor 60) has reached the predetermined upper, i.e., clockwise, limit of travel. Alternatively, the upper hand travel limiter may be dispensed with, and the upper limit of travel simply sensed by sensing an overcurrent condition in the motor, which will occur almost immediately upon the window covering reaching its upper limit of travel and, thus, resisting further turning of the head rail rod by the motor. Also, the LSW NAND gate 172 receives an input signal from the reed switch 106 when the abutment surface 104 of the travel limiter 100 (FIG. 4) urges the second arm 112 against the center arm 110 of the switch 106, indicating that the rack gear 94 (and, hence, the motor 60) has reached the predetermined lower, i.e., counterclockwise, limit of travel.

Also, a third limit switch can be provided in accordance with the principles set forth above to generate a signal when the window covering is a so-called "lift and tilt" shade, e.g., the "Silhouette" shade made by Hunter-Douglas, and is at a position marginally above its bottom travel limit. As is known in the art, such as shade is raised and lowered by rotating a tilt tube in the head rail. As is further known in the art, such a shade is "tilted" by continuing to rotate the tilt tube when the shade is fully lowered.

Per the present invention, to tilt such a window covering, the motor is caused to alternately energize and deenergize rapidly, to control the tilting. To lift such a window covering, on the other hand, the motor is continuously energized as described above. The third limit switch accordingly indicates when the window covering is near the bottom of its travel and, thus, when it is tiltable and hence when the motor should be alternately energized and deenergized quickly, and it also indicates when the window covering has been lifted past its bottom travel and, thus, should be lifted by continuously energizing the motor. In the present invention, the third limit switch is activated when the tilt tube is 180° rotated past its fully extended position toward the raised position.

Upon receipt of the appropriate signal from the reed switch 106, the USW NAND gate 170 generates the USW signal. Likewise, upon receipt of the appropriate signal from the reed switch 106, the LSW NAND gate 172 generates the LSW signal.

Further, independent of the position of the reed switch 106, in the even that the output signal of the direction NAND gate 174 is "FALSE", the USE NAND gate 170 generates a USW signal, and the LSW NAND gate 172 generates a LSW signal. Consequently, the motor 60 will be caused to stop if the direction NAND gate 174 senses the simultaneous existence of both a "motor run CW" (i.e., a "DRCW") signal and a "motor run CCW" (i.e., a "DRCCW") signal.

As discussed above, the LSW and USW signals are sent to the first and second limit switch NAND gates 164, 166 which generate input signals to the third limit switch NAND gate 168. In turn, the third limit switch NAND gate 168 sends a resetting signal to the motor run flip-flop 160 to cause the motor run flip-flop 160 to change state, i.e., to the "motor off" state.

Accordingly, when the motor 60 is rotating clockwise and the upper (i.e., clockwise) limit of rotation is reached, the reed switch 106 generates a signal which is sent via the following path to change the state of the motor run flip-flop 160 to cause the motor 60 to stop: USW NAND gate 170, first limit switch NAND gate 164, third limit switch NAND gate 168.

Likewise, when the motor 60 is rotating counterclockwise and the lower (i.e., counterclockwise) limit of rotation is reached, the reed switch 106 generates a signal which is sent via the following path to change the state of the motor run flip-flop 160 to cause the motor 60 to stop: LSW NAND gate 172, second limit switch NAND gate 166, third limit switch NAND gate 168.

FIG. 7 additionally shows that the "USW" and "LSW" signals are also sent to the motor direction flip-flop 162 via respective resistors R22, R23 to rest the flip-flop 162 to the appropriate state. Stated differently, the "USW" signal is sent to the motor direction flip-flop 162 via resistor R22 to rest the flip-flop 162 to the counterclockwise state, and the "LSW" signal is sent to the motor direction flip-flop 162 via resistor R23 to rest the flip-flop 162 to the clockwise state, when the appropriate travel limits have been reached.

The output signals of the flip-flop 160, 162 are each gated to type 4093 flip-flop CW and CCW NAND gates 176, 178. More specifically, both output signals of the motor run flip-flop 160 are gated to the NAND gates 176, 178, whereas only the "CW" output signal of the motor direction flip-flop 162 is gated to the CW NAND gate 176, and the "CCW" signal from the motor direction flip-flop 162 is gated to the CCW NAND gate 178.

As intended by the present invention, the flip-flop CW NAND gate 176 generates a "motor run CW" (i.e., the "DRCW") output signal only when the motor run flip-flop 160 inputs a "motor run" signal to the CW NAND gate 176 and the motor direction run flip-flop 162 inputs a "CW" signal to the NAND gate 176. Likewise, the flip-flop CCW NAND gate 178 generates a "motor run CCW" (i.e., "DRCCW") output signal only when the motor run flip-flop 160 inputs a "motor run" signal to the CCW NAND gate 178 and the motor direction flip-flop 162 inputs a "CCW" signal to the NAND gate 178.

Now referring to the daylight detector 134 shown in FIG. 7, the purpose of which is to energize the motor 60 to open or close the blind 14 upon detection of a predetermined level of light that is present at the daylight sensor 28, the daylight sensor 28 is electrically connected to a switch, preferably a first type 2N3904 transistor Q2. Accordingly, when light impinges upon the daylight sensor 28, the sensor 28 sends a signal to the transistor Q2.

If desired, energization of the motor 60 in response to signals generated by the daylight sensor 28 can be disabled by appropriately manipulating a two-position daylight disable switch 180. The switch 180 has an "AUTO" position, when automatic operation of the actuator 10 in response to signals from the daylight sensor 28 is enabled, and an "OFF" or "CLOSED" position, wherein automatic operation of the actuator 10 in response to signals from the daylight sensor 28 is disabled.

After receiving the signal from the daylight sensor 28, the first transistor Q2 turns on, and consequently causes a first type 2N3906 transistor Q1 to turn on. The output signal of the second transistor Q1 is sent via a resistor R4 to the base of the first transistor Q2, to establish a hysterisis-based electronic signal latch. Also, the output signal of the second transistor Q1 is sent to a type 4093 light NAND gate 182. Whenever the light NAND gate 182 receives a signal from the second transistor Q1, the NAND gate 182 changes state.

FIG. 7 shows that the output signal generated by the light NAND gate inverter 182 is sent to the so-called "D" input ports of type 4013 first and second stages 184, 186 of the daylight direction controller 136. The output signals of the stages 184, 186 are "motor run CW ("DRCW") and "motor run CCW" (DRCCW") signals, and are in turn respectively sent to type 4093 CW and CCW NAND gate motor controllers 188, 190 of the output amplifier circuitry 140.

To generate their motor run output signals, the stages 184, 186 of the daylight direction controller 136 must also receive input signals from the edge detector 138. As intended by the present invention, the edge detector 138 functions to prevent automatic operation of the blind 14 in the presence of detection signals generated by the daylight detector 136 in response to spurious light signals, e.g., automobile headlights at night.

FIG. 7 shows that the edge detector 138 includes a type 4077 exclusive NOR gate 194. As shown, the exclusive NOR gate 194 receives a first input signal directly from the light NAND gate 182 and a second input signal which originates at the NAND gate 182 and which is passed through the network established by a resistor R13 and a capacitor C4, and thence to a type 4093 NAND gate, used as an invertor, since on input is connected to battery voltage. With this arrangement, the exclusive NOR gate 194 generates a positive pulse output signal teach time the light NAND gate 182 changes state.

As further shown in FIG. 7, the output signal of the exclusive NOR gate 194 is sent to a type 4020 fourteen (14) stage binary counter 196. The counter 196 is associated with an oscillator 198 that includes a type 4093 NAND gate 199, and the counter is also associated with first and second type 4077 exclusive NOR gate inverters 200, 202. The exclusive NOR gate inverters 200, 202 cooperate to ensure correct phasing of the oscillator output clocking signal.

As disclosed above, when a detection signal is received from the light NAND gate 182 of the daylight detector 134, this is sent to the exclusive NOR gate 194 in the edge detector 138 and to the first and second stages 184, 186 in the daylight direction controller 136. The first and second stages 184, 186, however, do not immediately generate an output signal is response.

Instead, the exclusive NOR gate 194 immediately sends an output signal to the counter 196. In response, the counter 196 enables the oscillator 198 to generate output clocking signals, and the counter 196 commences counting the output clocking signals from the oscillator 198 until the first thirteen (13) stages of the counter have been filled with clocking signals. Then, the counter 196 sends an output signal to each of the first and second stages 184, 186 of the daylight direction controller 136.

In the embodiment shown, the oscillator 198 operates between about five Hertz and ten Hertz (5 Hz–10 Hz), and the thirteen (13) stages of counter 196 can store a total of eight thousand one hundred ninety two (8192) clocking signals. With this combination of structure, the counter 196 sends an output signal to the first and second stages 184, 186 of the daylight direction controller 136 about fifteen to twenty (15–25) minutes after receiving its input signal from the exclusive NOR gate 194.

FIG. 7 shows that the first and second stages 184, 186 of the daylight direction controller 136 receive both the signal from the counter 196, and the signal from the light NAND gate 182. Depending upon whether the blind 14 is to be opened at the onset of day or closed at the onset of night, based upon the state of the light NAND gate 182 as indicated by whether its output signal is "TRUE" or "FALSE", one of the stages 184, 186 will send a motor run signal to its associated NAND gate motor controller 188, 190 of the output amplifier circuitry 140 to cause the blind 14 to be opened or closed.

In the embodiment shown, the first stage 184 sends an output DRCW signal to the CW NAND gate motor controller 188 when the blind 14 is desired to be open. On the other hand, the second stage 186 sends an output DRCCW signal to the CCW NAND gate motor controller 190 when the blind 14 is desired to be shut. In either case, the blind 14 is operated only after a predetermined light level has been sensed continuously for 15–25 minutes by the daylight sensor 28.

Also, FIG. 7 shows that the first stage 184 receives the "USW" signal, while the second stage 186 receives the "LSW" signal. Upon receipt of the "USW" signal, indicating that the blind 14 is fully open, the first stage 184 stops sending its "motor run" output signal to the NAND gate motor controller 188. Likewise, upon receipt of the "LSW" signal, indicating that the blind 14 is fully shut, the second stage 186 stops sending its "motor run" output signal to the NAND gate motor controller 190.

The output amplifier 140 includes the two NAND gate motor controllers 188, 190. As shown in FIG. 7, the NAND gate motor controllers 188, 190 each receive inputs from the beam and manual detection controller 132, for opening and closing the blind 14 in response to user-generated signals from either the pushbutton 156 or the user signal generator 31, and form the daylight direction controller 136, for opening and closing the blind 14 in response to predetermined levels of daylight.

More particularly, the CW NAND gate motor controller 188 receives a DRCW input signal from the flip-flop CW NAND gate 176 only when the motor run flip-flop 160 inputs a "motor run" signal to the CW NAND gate 176 and when the motor direction flip-flop 162 inputs a "CW" signal to the NAND gate 176. Also, the CW NAND gate motor controller 188 can receive an input DRCW signal from the first stage 184.

On the other hand, the CCW NAND gate motor controller 190 receives a DRCCW input signal from the flip-flop CCW NAND gate 178 only when the motor run flip-flop 160 inputs a "motor run" signal to the CCW NAND gate 178 and when the motor direction flip-flop 162 inputs a "CCW" signal to the NAND gate 178. Also, the CCW NAND gate motor controller 190 can receive an input DRCCW signal from the second stage 186.

Upon receipt of either of its input DRCW signals, the CW NAND gate motor controller 188 sends the DRCW signal to a type 2N3904 CW gating transistor Q7 to turn on the gating transistor Q7, and the gating transistor Q7 then turns on a type 2N4403 CW power transistor Q6 and a type 2N4401 CW power transistor Q5. Once energized, the CW power transistors Q6, Q5 complete the electrical path (starting at a terminal 204) from the power supply 42, to the motor 60, and to ground (represented at a ground terminal 206) such that the motor 60 is caused to rotate clockwise to thereby move the blind 14 toward the open configuration.

In contrast, upon receipt of either of its DRCCW input signals, the CCW NAND gate motor controller 190 sends the DRCCW signal to a type 2N3904 CCW gating transistor Q4 to turn on the gating transistor Q4. In turn, the gating transistor Q4 turns on a type 2N4403 CCW power transistors Q3 and a type 2N4401 CCW power transistor Q8. Once energized, the CCW power transistors Q8, Q3 complete the electrical path (starting at a terminal 204) from the power supply 42, to the motor 60, and to ground (represented at a ground terminal 206) such that the motor 60 is caused to rotate counterclockwise to thereby move the blind 14 toward the closed configuration. Thus, the circuitry described above essentially functions as an electronic power switch having an open configuration and a closed configuration for selectively energizing the motor 60.

To conserve power when it is not desired to move the blind 14, power conservation resistors R15, R17, R20, R21 are provided to maintain the transistors Q3, Q5, Q6, Q8 off in the absence of a signal from the NAND gate motor controllers 188, 190.

The skilled artisan will appreciate that with the combination of structure disclosed above, the life of the power supply 42 is prolonged. More particularly, under normal operating conditions, with the use of light sensors 28, 29 that have low dark currents, and the use of the power conservation resistors R15, R17, R20, R21, as well as the remainder of the electronic circuit, the four batteries 44, 46, 48, 50 can operate the blind 14 for a relatively prolonged period because the optical signal is sensed and processed energy-efficiently. The skilled artisan will further recognize, however, that the use of a larger power supply in turn facilitates the use of light sensors having high dark currents. Also, the use of relatively sophisticated electronics (e.g., transistors) in the sensor circuitry further prolongs the life of the power supply. As will accordingly be recognized by the skilled artisan, the presently preferred embodiment achieves a relatively long life for the inexpensive, simple, and convenient dc power supply 42, with comparatively simple electronic components. It is to be further appreciated that the present circuit has an energized state, in which the batteries power the motor, and an idle state, in which the batteries do not power the motor.

TABLE 1

| Resistors | Value (Ohms) | Capacitors | Value (Farads) |
|---|---|---|---|
| R1 | 3.3M | C1 | 0.1μ |
| R2 | 3.3M | C2 | 0.1μ |
| R3 | 10M | C3 | 0.1μ |
| R4 | 10M | C4 | 0.01μ |
| R5 | 1.5M | C5 | 3300P |
| R6 | 3.3M | C6 | 3300P |
| R7 | 10M | C7 | 0.01μ |
| R8 | 10M | C8 | 0.01μ |
| R9 | 1.5M | | |
| R10 | 10M | | |
| R11 | 10M | | |
| R12 | 22M | | |
| R13 | 100K | | |
| R14 | 1K | | |
| R15 | 100K | | |
| R16 | 220 | | |
| R17 | 100K | | |
| R18 | 1K | | |
| R19 | 220 | | |
| R20 | 100K | | |
| R21 | 100K | | |
| R22 | 1.5M | | |
| R23 | 1.5M | | |
| R24 | 1.5M | | |
| R25 | 470K | | |
| R26 | 3.3M | | |

TABLE 1-continued

| Resistors | Value (Ohms) | Capacitors | Value (Farads) |
|---|---|---|---|
| R27 | 100 | | |
| R28 | 3.3M | | |

Figure 8:
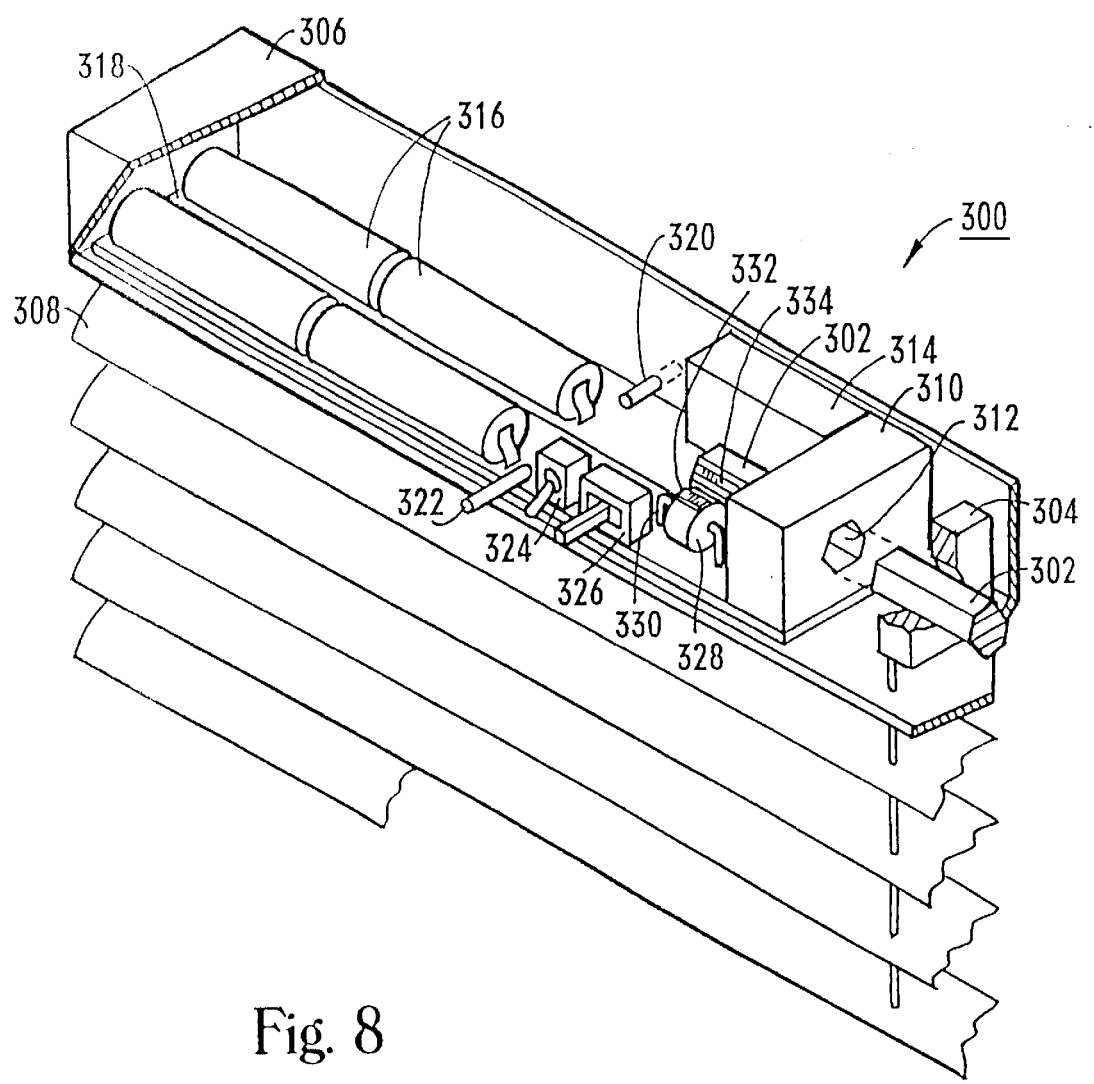
FIG. 8 is a perspective view of an alternate embodiment of the blind actuator present invention, with portions of the head rail of the blind cut away for clarity.
Figure 9:
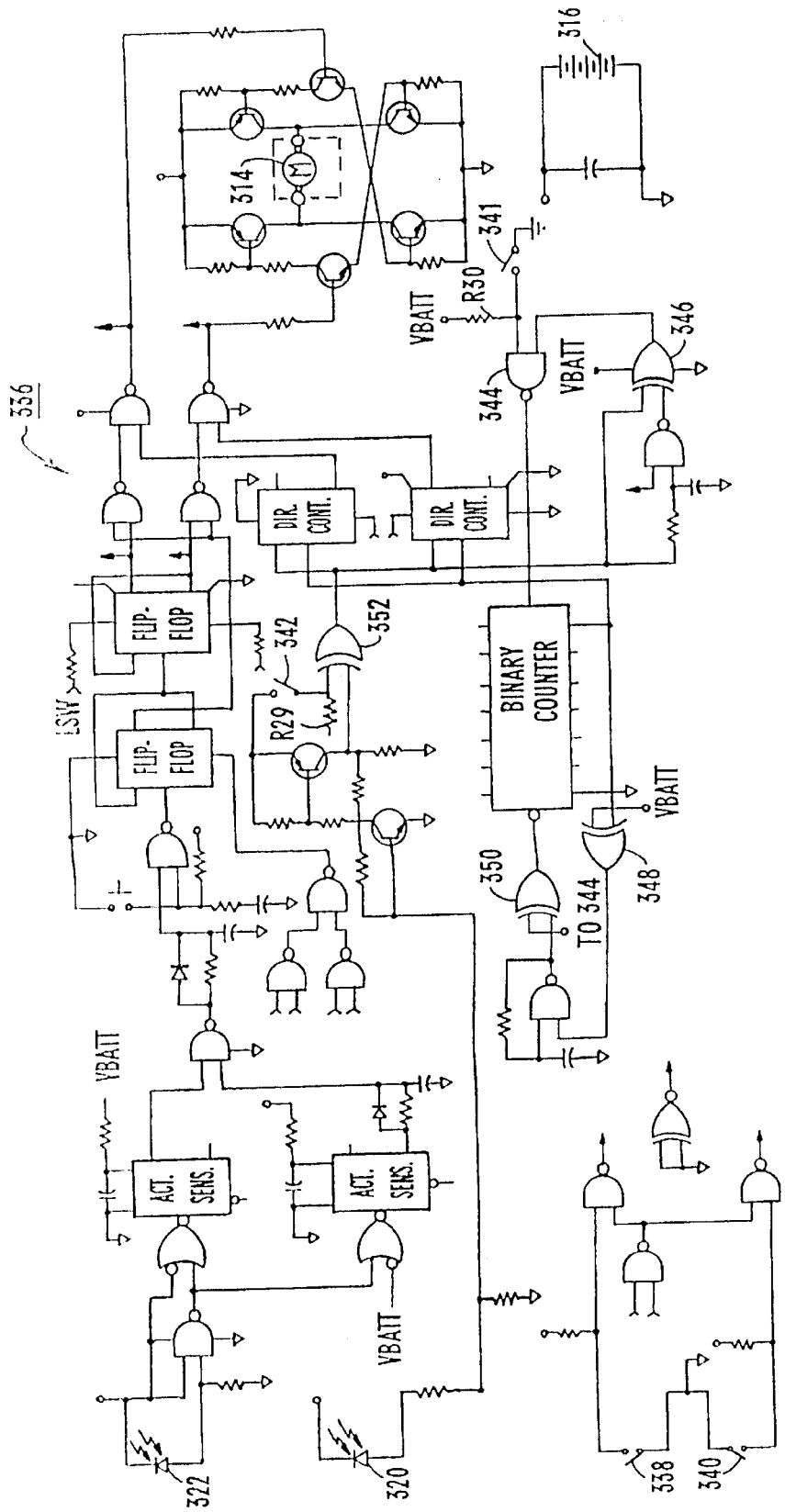
FIG. 9 is a schematic diagram of the electronic circuitry of the actuator shown in FIG. 8.

Now referring to FIGS. 8 and 9, an alternate embodiment of the actuator of the present invention is shown, generally designated 300, which is adapted to rotate a tilt rod 302 that is rotatably mounted by means of a block 304 in a head rail 306 of a mini-blind 308 to open and close the blind 308. The mini-blind 308 is in all other essential respects identical in construction and operation to the blind 14 shown in FIG. 1.

The actuator 300 shown in FIG. 8 is essentially identical to the actuator 10 shown in FIG. 1, except that the actuator 300 engages the tilt rod 302 of the blind 308 vice the operating baton (not shown) of the blind. Accordingly, the actuator 300 has a gear box 310 that is in all essential respects identical to the gear box 56 shown in FIG. 4, and a channel 312 of the gear box 310 engages the tilt rod 302.

A dc motor 314 is coupled to the gear box 310, and dc batteries 316 are electrically connected to the motor 314 through the electronic circuitry of a circuit board 318. It can be appreciated in reference to FIG. 8 that the circuit board 318 can be fastened to the head rail 306, e.g., by screws (not shown) or other well-known method, and the motor 314, gear box 310, and batteries 316 mounted on the circuit board 318.

A daylight sensor 320 and a signal sensor 322 are mounted on the circuit board 318 and electrically connected thereto. The sensors 320, 322 are preferably identical in construction to the sensors 28, 29 shown in FIGS. 1 and 2.

Also, a manually manipulable operating switch 324 is electrically connected to the circuit board 318. The switch 324 shown in FIG. 8 is substantially similar to the switch 156 shown in FIG. 1. Further, a three-position mode switch 326 in electrically connected to the circuit board 318. The switch 326 has an "off" position, wherein the daylight sensor 320 is not enabled, a "day open" position, wherein the blind 308 will be opened by the actuator 300 in response to daylight impinging on the sensor 320, and a "day shut" position, wherein the blind 308 will be shut by the actuator 300 in response to daylight impinging on the sensor 320.

FIG. 8 further shows that a manually manipulable adjuster 328 is rotatably mounted on the circuit board 318 by means of a bracket 330. The periphery of the adjuster 328 extends beyond the head rail 306, so that a person can turn the adjuster 328.

As intended by the present invention, the adjuster 328 has a metal strip 332 attached thereto, and the strip 332 on the adjuster 328 can contact a metal tongue 334 which is mounted on the tilt rod 302 when the tilt rod 302 has rotated in the open direction.

When the strip 332 contacts the tongue 334, electrical contact is made therebetween to signal the electrical circuit shown in FIG. 9 to deenergize the motor 314. Accordingly, the adjuster 328 can be rotationally positioned as appropriate such that the strip 332 contacts the tongue 334 at a predetermined angular position of the tilt rod 302. Stated differently, the tilt rod 302 has a closed position, wherein the blind 308 is fully closed, and an open position, wherein the blind 308 is open, and the open position is selectively established by manipulating the adjuster 328.

FIG 9 shows that the circuit board 318 of the actuator 300 has an electrical circuit 336 that, with the following exceptions, is in all essential respects identical to the circuit shown in FIG. 7, i.e., the electrical circuit 336 facilitates the energy-efficient detection and processing of an optical signal.

More particularly, an upper electrical limit switch 338 is closed when the strip 332 contacts the tongue 334 (FIG. 8), to indicate that the tilt rod 302 has rotated to the predetermined open position established by the angular position of the adjuster 328, and, hence, that the blind 308 has reached its maximum open position. When this occurs, the electrical path between the batteries 316 and the motor 314 is interrupted. As was the case with the circuit shown in FIG. 7, however, the fully closed position of the blind 308 is established by an electrical switch 340 which is in turn closed by a motion translating element (not shown) of the gear box 310, or by a stop (not shown) that can be fastened to one of the gears within the gear box 310.

Also, the mode switch 326 has been integrated as shown in two places in the electrical circuit 336, designated switch positions 341, 342. When the switch 326 is in the "day shut" position, the position 341 is closed, and otherwise the position is open as shown. A ten million ohm resistor R30 and a type 4093 NAND gate 344 are connected as shown to the position 341 of the mode switch 326.

When the switch 326 is in the "day open" position, the position 342 is open, as shown. Otherwise, the position 342 is shut. A ten million ohm resistor R29 is connected as shown to the position 342 of the mode switch 326.

The architecture of the circuit 336 shown in FIG. 9 is in all essential respects identical to the architecture of the circuit shown in FIG. 7, with the following exceptions. Type 4070 Exclusive OR gates 346, 348, 350, 352 (with appropriate connections to ground and/or the battery 316 voltage) have been inserted in the circuit as shown in FIG. 9, in place of the exclusive NOR gates 194, 202, 200, and NAND gate 182, respectively, shown in FIG. 7.

Figure 10:
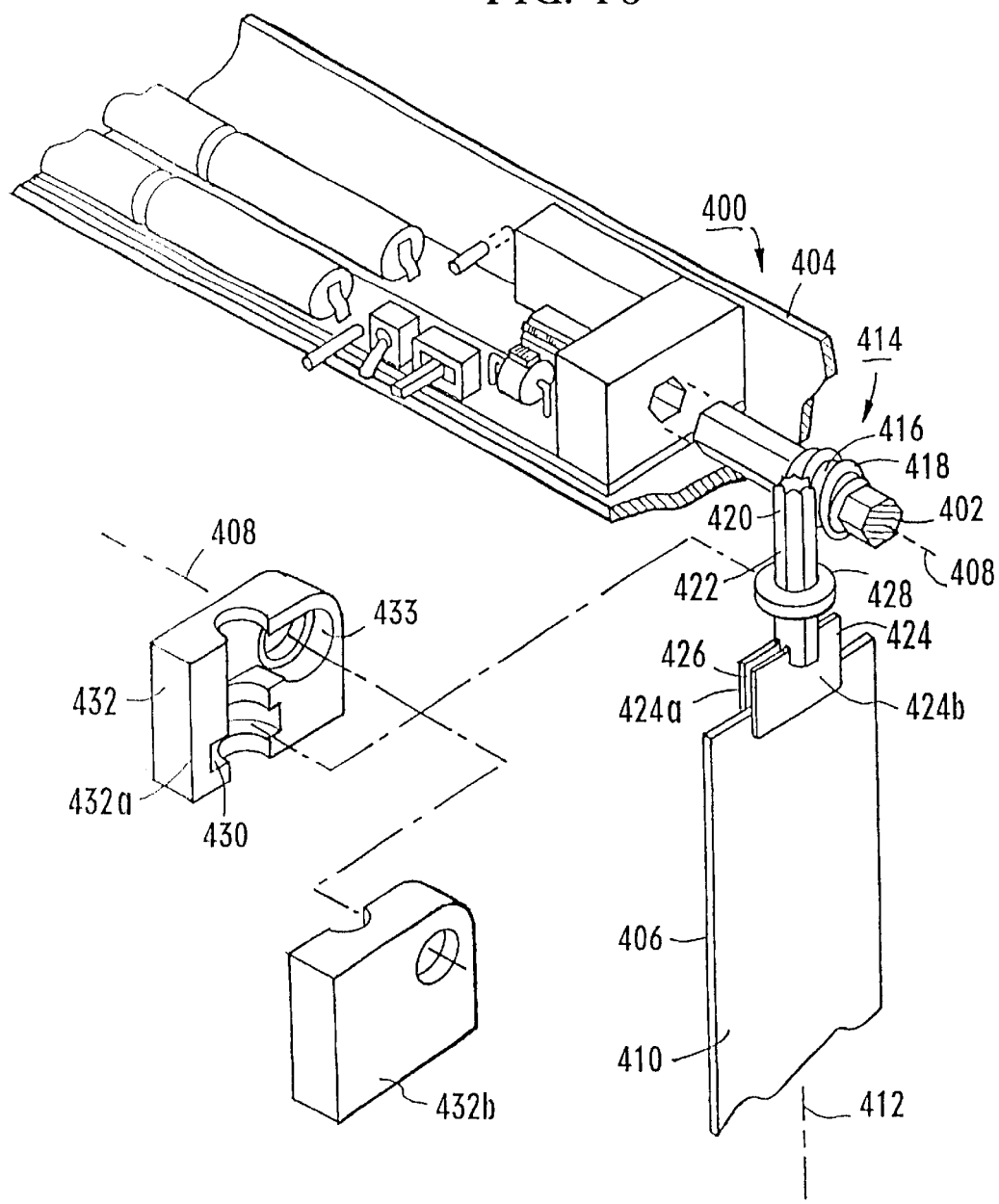
FIG. 10 is a partially exploded perspective view of still another alternate embodiment of the blind actuator of the present invention in conjunction with a vertical blind, with portions of the head rail of the blind cut away for clarity.

FIG 10 shows a mini-blind actuator, generally designated 400, that is used to rotate a rod 402 that is rotatably mounted in an elongated head rail 404 of a so-called vertical blind 406. It is to be understood that the actuator 400 is in all essential respects identical with the actuator 300 shown in FIGS. 8 and 9.

As can be appreciated in reference to FIG. 10, the rod 402 defines a first axis of rotation 408, and a plurality of elongated slats (only a single slat 410 shown in FIG. 10 for clarity of disclosure) are connected to the rod 402. While the slats are shown separated from each other in FIG. 10, it is to be understood that the slats can be connected to each other by connecting the edges of the slats to opposed continuous fabric sheets. As can be further appreciated in reference to FIG. 10, the slat 410 defines a second axis of rotation 412 which is oriented substantially perpendicularly to the first axis of rotation 408. In accordance with the present invention, rotation of the rod 402 about the first axis 408 causes rotation of the slat 410 about the second axis 412.

Stated differently, the head rail 404 and the rod 402 define a long axis 408, and the slat 410 defines a long axis 412, with the slat 410 depending downwardly from the head rail 404 such that the long axis 412 of the slat 410 is perpendicular to the long axis 408 of the head rail 404 and rod 402.

FIG. 10 shows that the slat 410 is connected to the rod 402 via a connector, generally designated 414. As shown, the connector 414 includes a hollow rod element 416 which is surroundingly engaged with the rod 402 in a close fit therewith, such that the rod element 416 can slide on the rod 402 but cannot rotate relative to the rod 402. Consequently, rotation of the rod 402 causes rotation of the rod element 416 about the first axis of rotation 408. It is to be appreciated that to this end, the rod element 416 is formed with bore which is configured substantially identically to the radial cross-sectional configuration, e.g., hexagonal as shown, of the rod 402. Alternatively, rotation between the rod 402 and rod element 416 can be prevented by other means, e.g., a set screw (not shown).

FIG. 10 shows that the rod element 416 is formed with an outer raised helical surface 418. As the skilled artisan will appreciate, when the rod element 416 rotates, the helical surface 418 "travels" longitudinally with respect to the rod 402.

Additionally, the connector 414 includes a slat element 420 that is formed with a plurality of channels 422. As shown, each channel 422 is oriented perpendicularly to the first axis of rotation 408. As further shown, at least one channel 422 is threadably engaged with the helical surface 418 of the rod element 416. Moreover, the slat element 420 is formed with a clip segment 424. The clip segment 424 includes left and right co-parallel parallelepiped-shaped clip plates 424a, 424b which define a slot 426 therebetween, and the slat 410 is fixedly held within the slot 426 by, e.g., a close interference fit or a solvent bond. Consequently, rotation of the rod element 416 about the first axis of rotation 408 causes rotation of the slat element 420 and, hence, slat 410, about the second axis of rotation 412.

A disc-shaped collar 428 is formed on the slat element 420. The collar 428 engages a groove 430 that is formed in a two-piece molded connector housing 432 having halves 432a, 432b to support the slat element 420 and hold the slat element 420 in threadable engagement with the rod element 416. As shown, each half 432a, 432b of the connector housing 432 is configured with a hole 433 that slidably engages the rod 402, and the connector housing 432 encloses and supports the connector 414.

It is to be understood that the blind 406 includes a plurality of slats, each of which is substantially identical in configuration and operation with the slat 410 with connector 414.

It is to be further understood in reference to the operation of the electrical circuit shown in FIG. 7 that the switch of the present invention, i.e., the first trigger 142 or transistor Q2, receives a control signal from the sensors 28, 29, respectively, and then activates the electronic circuit in response thereto to permit the circuit to cause the power supply 42 to energize the motor 60. With this arrangement, the electronic circuit is deactivated in the absence of the control signal. Likewise, the circuit shown in FIG. 9 is deactivated in the absence of the control signal.

Figure 11:
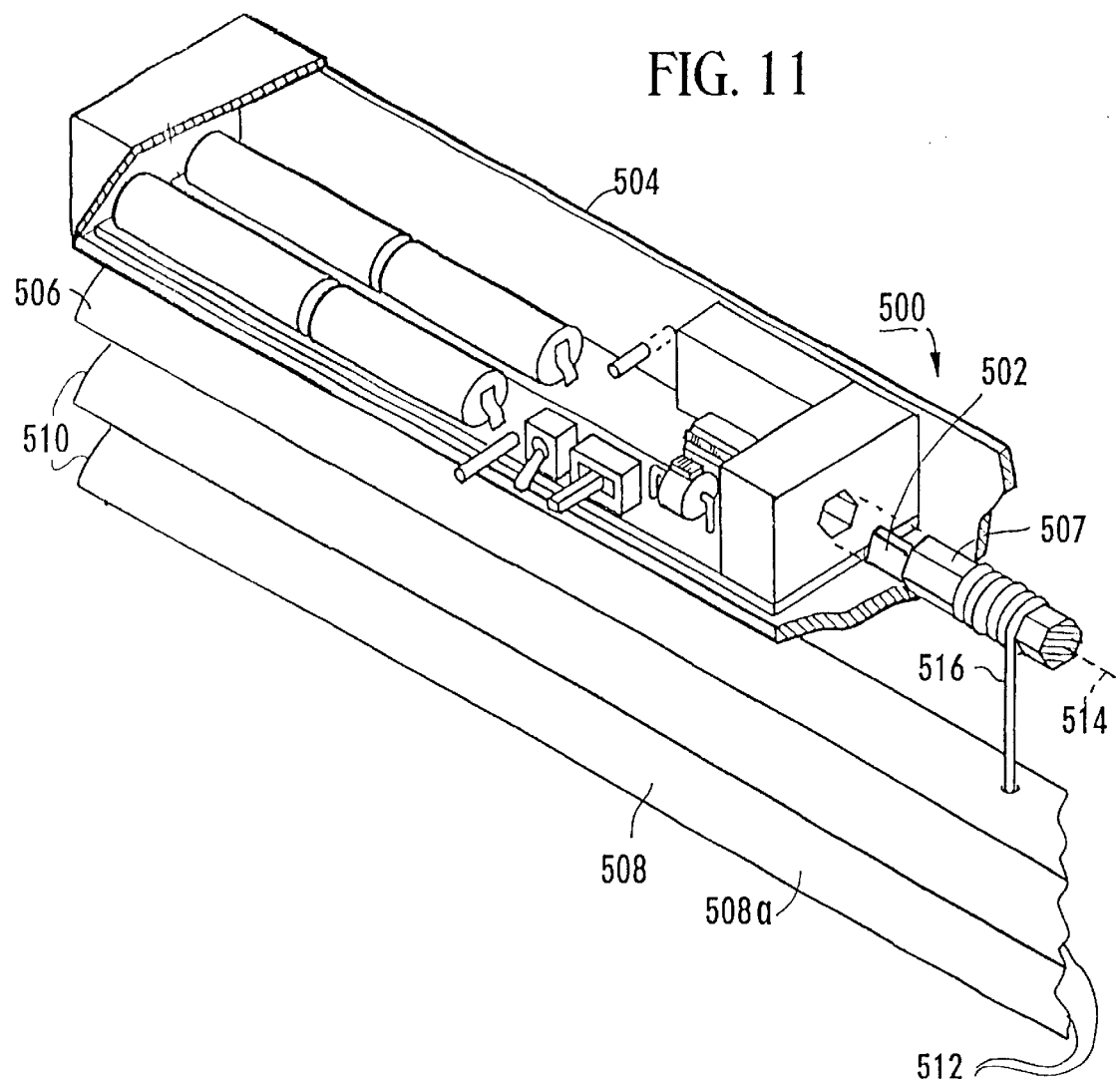
FIG. 11 is a perspective view of another alternate embodiment of the blind actuator of the present invention in conjunction with a pleated shade, with portions of the head rail of the blind cut away for clarity.

FIG 11 shows a mini-blind actuator, generally designated 500, that is used to rotate a shaft-like rod 502 that is rotatably mounted in an elongated head rail 504 of a so-called pleated or cellular shade 506. In the embodiment shown in FIG. 11, the shade 506 is an accordion-type window covering, i.e., the shade 506 compressively accordions upwardly to a raised configuration and expansively accordions downwardly to a lowered configuration. Accordingly, in one presently preferred embodiment, the rod 502 is keyed to a capstan 507 for rotating the capstan 507 while permitting slidable motion of the capstan 507 relative to the rod 502. U.S. Pat. No. 4,623,012 to Rude et al., incorporated herein by reference, discloses one acceptable shaft-capstan arrangement for use with pleated shades.

It is to be understood that the actuator 500 is in all essential respects identical with the actuator 300 shown in FIGS. 8 and 9.

As is well-known in the art, the shade 506 includes a plurality of elongated sections 508 that are jointed at their respective left and right edges 510, 512. As shown, the sections 508 are horizontally mounted, i.e., the long axes of the sections 508 are parallel to the long axis 514 of the head rail 504. A drawstring 516 is partially wound around the capstan 507 and is engaged by means well-known in the art to at least a bottom-most section 508a.

In accordance with the present invention, the actuator 500 can be actuated to rotate the rod 502 and capstan 507 and thereby raise or lower the bottom-most section 508a of the shade 506 relative to the head rail 504. In other words, the rod 502 can be rotated to cause the bottom-most section 508a to move translationally relative to the head rail 504, with the bottom-most section 508a (and, indeed, the remaining sections 508) staying parallel to the head rail 504 during the raising and lowering process.

As the bottom-most section 508a is raised, the shade 506 compressively accordions upwardly. On the other hand, as the bottom-most section 508a is lowered, the shade 506 expansively accordions downwardly.

Figure 12:
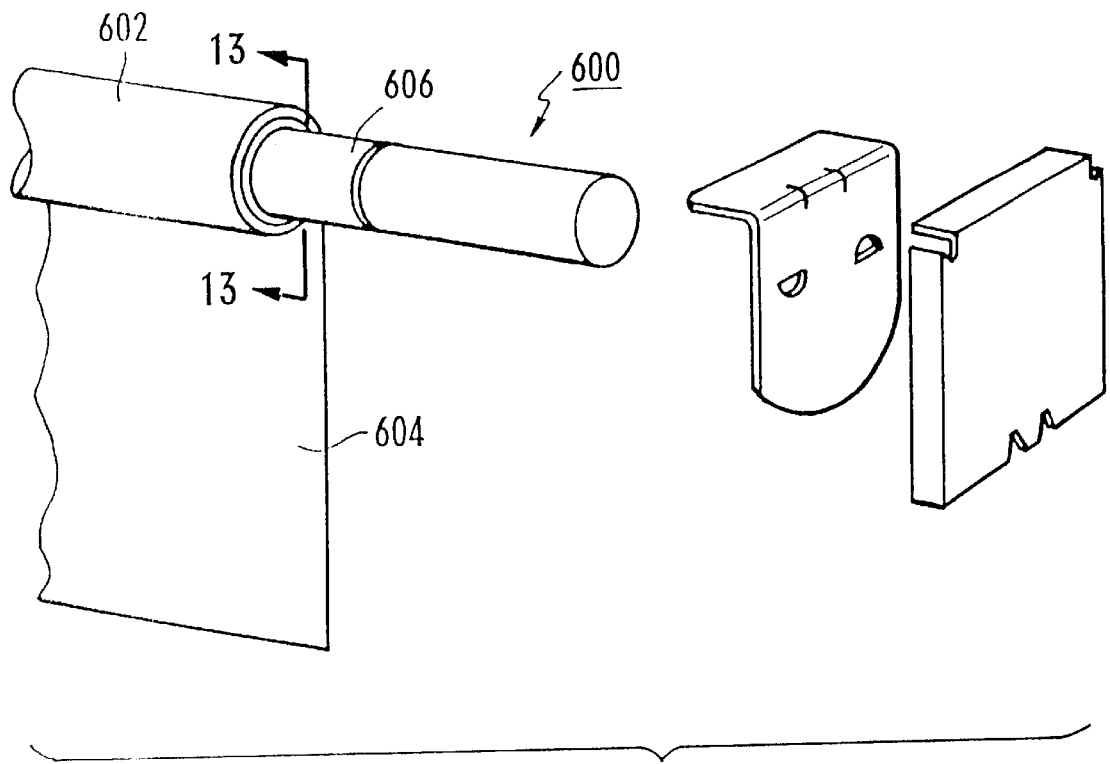
FIG. 12 is a perspective view of another alternate embodiment of the window covering actuator of the present invention in conjunction with a roll-up shade, with portions cut away for clarity.
Figure 13:
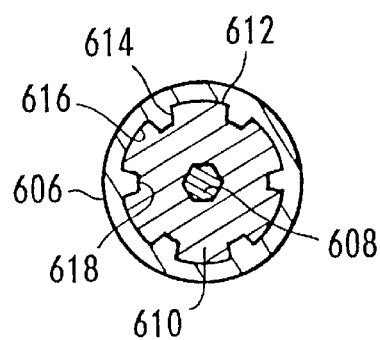
FIG. 13 is a cross-sectional view, as seen along the line 13—13 in FIG. 12.

Now referring to FIGS. 12 and 13, a window covering actuator, generally designated 600, is shown combined with a roll-up shade 602. It is to be understood that the actuator 600 is in all essential respects identical with the actuator 300 shown in FIGS. 8 and 9, in that the actuator 600 includes the batter-operated dc motor and gears with control circuitry disclosed herein. As shown, the actuator 600 can be contained in a cylindrical enclosure or in an enclosure having a shape other than cylindrical, as appropriate for the particular structural combination.

As is well-known in the art, the shade 602 includes a continuous rollable shade portion 604 that can be rolled and unrolled from around a hollow, generally cylindrical aluminium tube 606 when the tube 606 is rotated. As intended herein, the actuator 600 is activated as described above in reference to the head-rail mounted actuators, and is coupled to the tube 606 to rotate the tube and, thus, raise and lower the shade portion 604 of the roll-up shade 602.

FIG. 13 shows the means by which the actuator 600 is coupled to the tube 606 to rotate the tube 606. A shaft 608 is engaged with the main reduction gear channel of the actuator 600, it being understood that the actuator 600 shown in FIGS. 12 and 13 includes a main reduction gear that is substantially identical in configuration and purpose to the main reduction gear 82 shown in FIG. 4. In turn, the shaft 608 is keyed, bonded, soldered, welded, brazed, or otherwise attached to a generally disc-shaped collar 610.

As shown, the inner surface 612 of the tube 606 includes a plurality of ribs 614, each of which is parallel to the axis of rotation of the tube 606. The outer periphery 616 of the collar 610 is configured for closely engaging the ribs 614. More particularly, the outer periphery 616 of the collar 610 is formed with a plurality of notches 618, each of which is substantially identical in radial cross-section to the ribs 614 so as to closely engage a perspective rib 614. Stated differently, the ribs 614 establish respective keys, and the notches 618 establish respective keyways for interlocking with the keys established by the ribs 614.

Figure 14:
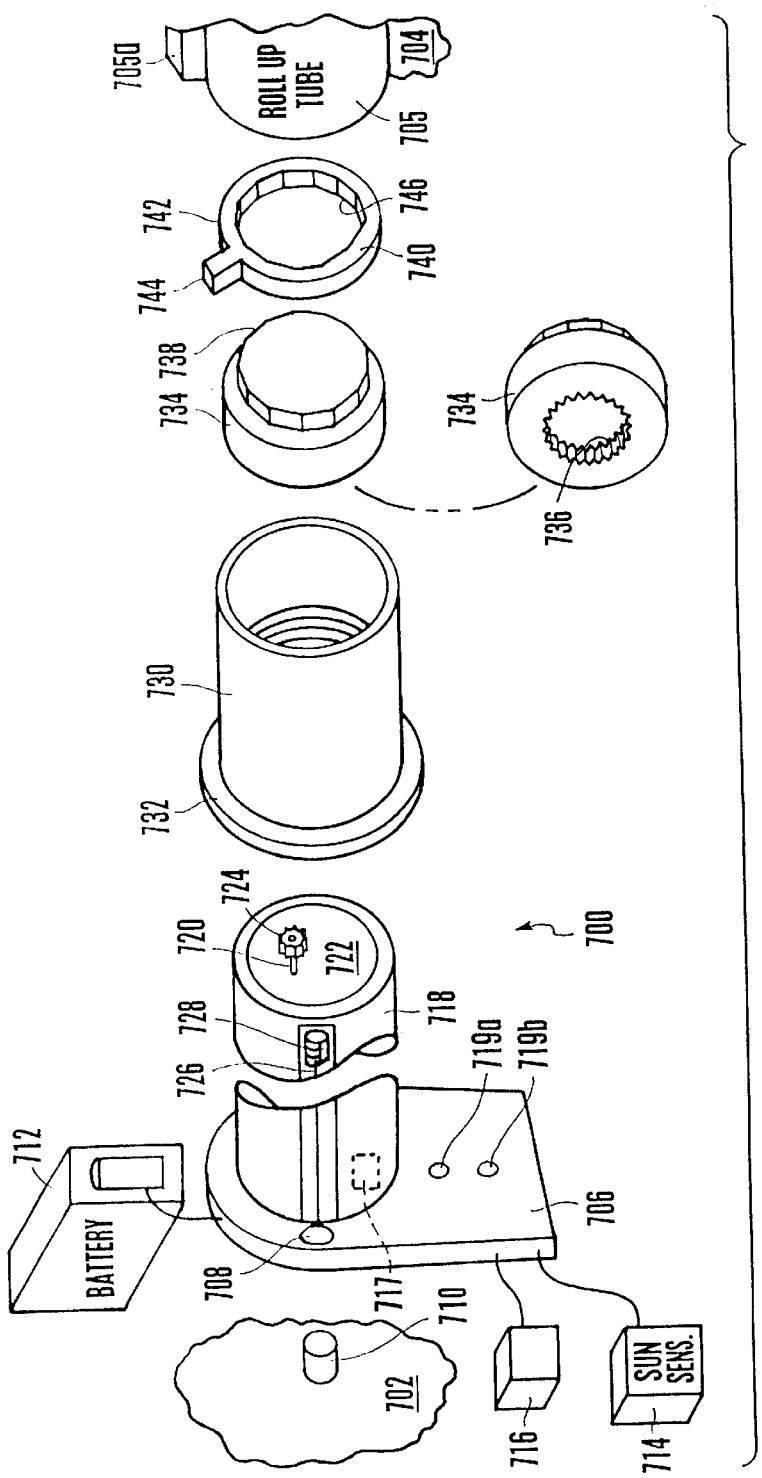
FIG. 14 is an exploded perspective view of an alternate embodiment of the roll up shade.

FIG. 14 shows a roll up shade, generally designated 700, which includes a head rail 702 (only the inside surface of a vertical side wall of the head rail 702 is shown) and a rollable shade-type window covering 704 depending from a hollow cylindrical shade tube 705 that is rotatably mounted in the head rail 702 as discussed in greater detail below. The window covering 704 can be, e.g., a single rollable fabric sheet, or a double fabric sheet assembly having horizontal fabric sheets interposed between the sheets, such as the Silhouette® device made by Hunter Douglas. In the Silhouette® device, the "slats" may be tilted by rotating the shade tube 705 when the shade is in the fully lowered position. Once the slats are tilted, further rotation of the shade tube 7-5 raises the shade.

A hollow plastic electronics cartridge 706 is formed with a non-circular (e.g., hexagonal) keyway 708, and the keyway 708 is configured for closely engaging a complimentarily-shaped key 710 on the head rail 702. At least one primary dc battery 712, e.g., an alkaline battery or a nine volt nickel-cadmium battery, is sufficiently small so as to be disposable in the head rail 702, and indeed can be mounted in the head rail 702 or suspended therefrom. The battery 712 is electrically connected to an electronic control circuit within the electronics cartridge 706. Also, a sunlight sensor 714 for moving the shade 700 in response to a sunlight signal and an operating signal sensor 716 for moving the shade in response to a user-generated signal as described above are mounted on the head rail 702 and are electrically connected to the electronic control circuit within the electronics cartridge 706.

A hollow cylindrical plastic motor casing 718 is attached to the electronics cartridge 706. It is to be understood that the motor casing 718 holds a preferably dc motor 717 (shown in phantom) and associated reduction gears that are in all substantial respects identical to the motor and gears shown and described previously. Or, the motor 717 can be a small ac motor or stepper motor with appropriate power conversion circuitry.

It is to be understood that the motor 717 is electrically connected to the electronic control circuit within the electronics cartridge 706, for selectively connecting the battery 712 to the motor 717. An example of the present control circuit as embodied in a chip is shown in Appendix A, made by Holt Integrated Circuits, Inc. of California and designated a type 6023 chip. Together, the electronics cartridge 706 and the motor casing 718 establish a support for holding the motor 717.

If desired, a manual pushbutton 719a can be depressed by a person to cause the shade 700 to move in the absence of a sunlight signal or user-generated signal. Further, a program pushbutton 719a can be provided to enable a person to program predetermined position for the shade 700. In the preferred embodiment, the person depresses the manual pushbutton 719a to move the shade to its lowest (fully lowered) position, depresses and holds down the program pushbutton 719b to raise the shade. When the shade is at the desired height, the person releases the pushbutton. The electronic circuit within the electronic cartridge 706 is configured to time the period from when the shade started to rise until the program pushbutton is released, and this period is "remembered" for operation to be subsequently disclosed.

A drive shaft 720 extends through an end wall 722 of the motor casing 718. The drive shaft 720 is rotated by the motor/gear train assembly within the motor casing 718, and it terminates in a small pinion gear 724. Alternatively, a planetary gear train can be used. Additionally, an elongated nut channel 726 is formed longitudinally on the motor casing 718, and an externally threaded nut 728 is constrained to linear reciprocating movement within the nut channel 726.

An internally threaded hollow plastic stovepipe 730 is threadably engaged with the externally threaded nut 728 for rotationally movement relative thereto. As shown in FIG. 14, the stovepipe 730 includes a disc-shaped hollow flange 732 that abuts the electronics cartridge 706. The skilled artisan will appreciate that as the stovepipe 730 turns, the nut 728 travels in the nut channel 726. Per the present invention, the nut 728 can abut and thus close a limit switch (not shown) when the nut is at one or the other end of the channel 726.

As can be appreciated in reference to FIG. 14, a hollow plastic cylindrical collar coupling 734 is engaged with the stovepipe 730 in an interference fit therewith. Or, the collar coupling 734 can be made integrally with the stovepipe 730. To engage the collar coupling 734 with the pinion gear 724, so that rotation of the pinion gear causes rotation of the collar coupling 734 with stovepipe 730, a rear inner edge 736 of the collar coupling 734 is formed as an endless gear that is meshed with the pinion gear 724.

Opposite the rear edge 736, the collar coupling 734 is formed with a faceted coupling 738. The faceted coupling 738 is faceted in that its outer edge is symmetrical and non-circular, as shown.

A hollow plastic ring-shaped collar 740 is configured for engaging the shade tube 705. More specifically, when the tube 705 is formed with an elongated channel 750a a shown, the outer periphery 742 of the collar 740 is formed with a non-circular key 744 that is configured for close slidable engagement with the channel 705a of the shade tube 705. It is to be understood that the outer periphery 742 of the collar 740 can assume other shapes to conform to configurations of shade tube channels other than that shown in FIG. 14.

Furthermore, the inner periphery 746 of the collar 740 is complimentarily configured to the faceted coupling 738 of the collar coupling 734 as shown. Accordingly, the collar 740 is keyed to the collar coupling 734. With this structure, it may now be appreciated that when the motor 717 inside the motor casing 718 is energized to turn the pinion gear 724, the pinion gear 724 travels in the endless gear established by the rear edge 736 of the collar coupling 734. In turn, the collar coupling 734 rotates, thereby rotating the collar 740 and, thus, the shade tube 705.

As mentioned above, an example of a chip embodiment of the electronic control circuit shown in FIGS. 7 and 9 is provided in Appendix A. It is to be understood that the circuit shown in Appendix A can also embody automatic functionalities in addition to those discussed above, depending on the particular type of window covering, with automatic sunlight-based functionalities being overridable by user-generated command signals when desired. These additional functionalities are discussed in reference to FIGS. 15–27 below. Specifically, the additional functionalities permit (1) shade positions to be programmed; (2) shades having internal fabric slats connected along their edges to opposed fabric sheets (e.g., the shade marketed by Hunter Douglas under the trademark "Silhouette") to be lifted and tilted; and (3) shades having only a single fabric sheet to be lifted. It is to be further understood that the new functionalities pertain generally to sunlight signal conditions, and that the new functionalities exist along with the above-described user-generated control signal operations. In addition to the above-described functionalities, the present invention can cause the bottom edge of a Silhouette®-style roll up shade to turn out when in the fully lowered position. The functionality is referred to below as the "curve out mode" or "CRVO" mode.

In understanding the flow charts below, the following types of window coverings to which the various flow charts are applicable are as follows: type I, lift and tilt louvered blinds such as 1- or 2-inch wood or 1-inch aluminum horizontal blinds; type II, roll up, single sheet fabric or cellular blinds; and type III, two sheer fabric sheets supporting the edges of opaque fabric louvers (e.g., the shade marketed by Hunter Douglas under the trademark "Silhouette").

FIG. 15 shows the process undertaken by the circuit shown in Appendix A to raise lowered type II and III window coverings upon the detection of daylight (with the time delay discussed above), when the user has not programmed a predetermined position of the shade. It is to be understood that when the shade is not in the fully raised position and the user generates a user control signal to raise the shade and does not stop the shade at a potion intermediate the fully lowered and fully raised positions, the steps shown in FIG. 15 after the block indicating "sunrise" are followed.

The process shown in FIG. 15 commences at an idle state 750 and, upon the detection of sunrise at block 752 (indicated by the uninterrupted reception of a daylight signal for a predetermined period as discussed above) or a user-generated control signal, the process moves to block 754 to turn the motor 717 clockwise (hereafter "CW") continuously, without modulating the power supplied to the motor 717, to raise the shade toward the fully raised position as described above in reference to FIG. 14. It is to be understood that the motor 717 could be configured to turn counterclockwise (hereafter "CCW") to raise the shade and CW to lower it, or that the shade might be fully raised at night, and then lowered at sunrise, in which cause block 752 in FIG. 15 triggers block 754 not upon sunrise, but upon sunset.

The shade is raised until one of four events occurs. As indicated at block 756, when the upper limit switch described previously is actuated, the motor 717 stops. Alternatively, block 756 can embody an overcurrent sensor that senses when the motor 717 draws excessive current and that then stops the motor. Such an overcurrent condition indicates that the shade has ceased to move.

Still further, the motor 717 stops when a user generates a user-generated control signal, either remotely or by pushing the manual pushbutton 719a (FIG. 14), as the shade is being raised. Additionally, the motor 717 stops after a predetermined time out period has elapsed from when the motor 717 was energized at block 754.

FIG. 16 shows the operation of the circuit shown in Appendix A for the above-mentioned Silhouette® roll up shade (type III) which both lifts and tilts in response to rotation of the shade tube 705, assuming no predetermined position has been programmed by the user and assuming the shade commences below the intermediate limit switch ILS. Also, FIG. 16 applied to unprogrammed type I window coverings that begin at a state above the lower limit switch. The process shown in FIG. 16 commences at an idle state 758 and, upon the detection of sunrise at block 760, the process moves to block 762 to turn the motor 717 CW using a modulated pulsing of the motor 717 to thereby slow the rotation of the shade tube 705 and, thus, facilitate "tilting" of the fabric slats of the shade, prior to lifting. In the preferred embodiment, the motor 717 is pulsed with nine (9) power pulses per second at a twelve and one-half percent (12.5%) duty cycle for seven (7) seconds.

After tilting the fabric slats at block 762 by slowing rotating the shade tube 705, the circuit proceeds to block 764 to continuously energize the motor 717, with no power modulation, to thereby more quickly rotate the shade tube 705 and lift the shade to the fully raised position. The motor stops at block 766 under the same conditions as described at block 756 in FIG. 15.

Figure 16A:
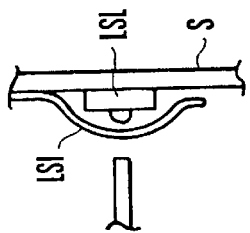
FIG. 16A is a side view of a dual limit switch assembly for use in roll up shades, with portions broken away.

Referring briefly to FIGS. 16 and 16A, an intermediate limit switch LSI can be provided that operates after a lower switch LSL opens, to indicate that the "slats" have tilted and that the shade is beginning to rise. This signals the circuit that the shade is configured such that the motor 717 may be continuously energized after waiting for the full seven seconds to elapse. More specifically, FIG. 16A shows that a button-type lower limit switch LSL can be mounted on a conductive surface "S", and a curved leaf spring that establishes the intermediate limit switch LSI is anchored at a fixed end "F" to the surface "S", with the intermediate limit switch LSI being biased such that an opposed end "O" that is opposed to the fixed end "F" is distanced from the surface "S".

Recall that the motor 717 shown in FIG. 14 is associated with a reduction gear assembly that is substantially identical to that shown in FIG. 4. When an abutment surface "A" of a travel limiter that is in all essential respects identical in configuration and operation to the travel limiter 98 shown in FIG. 4 contacts the intermediate limit switch LSI, the opposed end "O" is urged against the surface "S" to generate an intermediate signal. Then, further movement of the travel limiter compresses the intermediate limit switch LSI against the lower limit switch LSL to close the lower limit switch LSL. In contrast, when the travel limiter moves away from the limit switches, the lower limit switch LSL first opens as the intermediate limit switch LSI is partially relieved, and then the intermediate limit switch LSI opens as it is completely relieved, at which time the motor 717 is energized continuously. Because the preferred circuit uses the inverse of a lift signal, and the LSI closes in the lowered position, the intermediate signal from the LSI is inverted. Further, when the chip shown in Appendix A is used, it is necessary to position the LSI physically above the range of a window covering's pulse mode movement, so that the inverse intermediate (i.e., the "not LIFT") signal will not override the CRVO mode pulsing movement.

FIG. 17 shows the steps followed by the present circuit for raising, from the fully lowered position (i.e., with the lower limit switch of the present invention closed), the above-mentioned type I and type III window coverings when programming a predetermined (also referred to herein as preprogrammed) position is permitted. The process shown in FIG. 17 commences at an idle state 768 and, upon the detection of sunrise at block 770, the process moves to block 772 to turn the motor 717 CW using a modulated pulsing of the motor 717 at ten (10) pulses per second until the lower limit switch opens at block 774. Then, the motor is pulsed at (9) pulses per second at block 776 for seven (7) seconds. It is to be understood in reference to FIGS. 17–19 that should the window covering arrive at the preprogrammed position during the 7 seconds of pulsing, or at the ULS, the motor stops immediately. Assuming that the preprogrammed positioned has not been encountered, after the seven second pulsing, the process moves to block 717 to continuously energize the motor 717, with no power modulation, to thereby more quickly rotate the shade tube 705 and lift the window covering to the fully raised position. The motor stops at block 778 under the same conditions as described at block 766 in FIG. 15, or until the predetermined position (i.e., the programmed position) has been reached as indicated by the time period described above.

Now referring to FIG. 18, the steps followed by the present circuit for raising, from a position intermediate the fully lowered position and the fully raised position (i.e., with the upper and lower limit switches of the present invention open), the above-mentioned type I window covering when programming a predetermined position is permitted can be seen. Also, FIG. 18 applies to programmed type II shades below LSI but above LLS, with the exception noted below. Commencing at an idle state 780, upon the detection of sunrise at block 782 the process moves to block 784 to turn the motor 717 counterclockwise (CCW) using a modulated pulsing of the motor 717 at nine (9) pulses per second for seven seconds. Then, at block 786 the motor is driven continuously CCW until the lower limit switch closes at block 788, if the window covering is type I, with block 786 being omitted when the window covering is a type III. In this way, the window covering is driven down to its fully lowered position, so that the circuit then need simply raise the shade using steps 790–798 which are substantially identical to the steps 772–778 described in reference to FIG. 17.

FIG. 19 shows the steps followed by the present circuit for moving the above-mentioned type III Silhouette® roll up shade to a programmed predetermined position upon the detection of sunrise when the shade is above LSI, and for moving a programmed type I shade at the fully open position. Commencing at an idle state 800, upon the detection of sunrise at block 802 the process moves to block 804 to turn the motor 717 counterclockwise (CCW) continuously, i.e., without modulating the power to the motor 717, until the lower limit switch closes at block 806. In this way, the shade is driven down to its fully lowered position, so that the circuit then need simply raise the shade using steps 808–816 which are substantially identical to the steps 772–778 described in reference to FIG. 17.

FIGS. 20–22 show the steps followed by the present circuit for operating a lift-only roll-up shade (i.e., type II) that has a predetermined position programmed. FIG. 20 shows the steps for raising the shade when it is at the fully lowered position. Commencing at idle state 818, the present circuit detects sunrise at block 820, and then at block 822 drives the motor 717 continuously CW. The lower limit switch opens at block 824, and the motor continues to be driven continuously CW at block 826. The motor stops at block 828 when the upper limit switch closes, or on an overcurrent condition, or upon receipt of a user-generated signal, or upon reaching the programmed predetermined position.

In contrast, FIG. 21 shows the steps that are followed for raising the shade when it is intermediate the fully lowered and fully raised positions. Commencing at idle state 830, the present circuit detects sunrise at block 832, and then at block 834 continuously drives the motor 717 CCW to lower the shade. At block 836, the lower limit switch closes, indicating that the shade has reached the fully lowered position. Blocks 838–844 are then executed as described above in reference to blocks 822–828 of FIG. 20.

Moving to FIG. 22, the circuit undertakes the following steps to move a type II shade to a programmed predetermined position at sunrise when the shade is at the fully raised position. Commencing at idle state 846, the present circuit detects sunrise at block 848, and then at block 850 the upper limit switch is disabled. The shade is then lowered to the fully lowered position by continuously energizing the motor 717 CCW at block 852, until the lower limit switch closes at block 854. Then, the upper limit switch is reenabled at block 856, and steps 858–860 are next undertaken to raise the shade to the programmed position (or to the fully raised position) as described above in relation to blocks 822–828 of FIG. 20.

FIGS. 23–27 show the circuit logic that is undertaken for lowering window coverings at sunset, under the convention used for disclosure purposes that shades are desired to be lowered at sunset and raised at sunrise. When the window covering is a type I covering with CRVO not selected in the circuit during manufacturing, or when the window coverings a type II shade that is not at the LLS, the logic shown in FIG. 23 is followed. Commencing at idle state 866, the present circuit detects sunset at block 868, and then at block 870 the shade is lowered to the fully lowered position by continuously energizing the motor 717 CCW. The motor is deenergized at block 870 when the lower limit switch closes, an overcurrent condition occurs, a predetermined time out period has elapsed, or a user-generated control signal is received.

FIG. 25 refers to a type I window covering without the CRVO mode selected, intermediate the upper and lower limit switches. At idle state 882, when sunset is detected at block 884, the motor 717 is pulsed in the CCW direction at block 886 by modulating the power to the motor as described above at nine (9) pulses per second for seven (7) seconds, to allow the slats to close. Next, the motor 717 is energized continuously in the CCW direction at block 888 until a stop even occurs at block 890.

As mentioned above, the present invention can cause the bottom edge of a Silhouette®-style roll up shade or a type I lift and tilt blind to turn out ("CRVO" mode) when in the fully lowered position. FIGS. 26, 26a, and 27 illustrate this feature, which is implemented during manufacture. Specifically, for a type I window covering with CRVO selected, commencing with the blind at the ULS, or for a type III shade above the intermediate limit switch LSI at idle state 892 in FIG. 26, when sunset is detected at block 894 the motor 717 is continuously energized in the CCW direction at block 896 to lower the shade until the lower limit switch closes at block 898. At block 900 the motor is pulsed at nine (9) pulses per second for seven (7) seconds in the raise (i.e., CW) direction, which causes the bottom edge of the window covering to turn slightly outwardly. The motor is then stopped at block 902. On the other hand, FIG. 26a shows that for a type III shade below the intermediate limit switch LSI at idle state 892a in FIG. 26, when sunset is detected at block 894a the motor 717 is pulsed at 9 pulses per second in the CCW direction at block 897 to lower the shade until the lower limit switch closes at block 898a. At block 900a the motor is pulsed at nine (9) pulses per second for seven (7) seconds in the raise (i.e., CW) direction, which causes the bottom edge of the window covering to turn slightly outwardly. The motor is then stopped at block 902a.

FIG. 27 illustrates the above feature when a type I lift and tilt blind is intermediate the fully raised and fully lowered positions at idle state 904, with CRVO selected. When sunset is detected at block 906, the motor 717 is pulsed at nine (9) pulses per second for seven (7) seconds in the CCW direction. Then, the circuit undertakes the activities indicated at blocks 910–916, which are identical to the activities described above in reference to blocks 896–902 of FIG 26.

While the particular head rail-mounted window covering actuator as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by noting other than the appended claims.

What is claimed is:

1. A device for moving an operator of a window covering, the window covering being selected from the group of window coverings including vertical blinds, horizontal blinds, cellular shades, pleated shades, and lift and tilt shades, the device comprising:

an actuator including at least one electric motor in a head rail of the window covering and coupled to the operator in the head rail, a rotor of the motor being provided for rotating the operator in either direction, the head rail defining a length; and at least one direct current battery supported by the head rail, the battery energizing the motor to move the operator in response to a control signal, the window covering extending substantially the length of the head rail such that, when the window covering is in a closed configuration, the window covering covers the entire surface area of a window with which the head rail is engaged.

2. The device of claim 1, wherein the battery is mounted in the head rail of the window covering.

3. The device of claim 1, wherein the at least one battery is the sole source of power for the motor.

4. The device of claim 1, wherein the at least one battery is an alkaline or lithium battery.

* * * * *